United States Patent
Xu et al.

(10) Patent No.: US 10,299,147 B2
(45) Date of Patent: May 21, 2019

(54) TECHNIQUES FOR FILTERING CANDIDATE CELLS

(71) Applicant: Intel IP Corporation, Santa Clara, CA (US)

(72) Inventors: Wen Xu, Neubiberg (DE); Xiaojun Ma, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 1236 days.

(21) Appl. No.: 14/480,807

(22) Filed: Sep. 9, 2014

(65) Prior Publication Data
US 2015/0071103 A1    Mar. 12, 2015

(30) Foreign Application Priority Data

Sep. 11, 2013 (DE) .................. 10 2013 015 167

(51) Int. Cl.
| | |
|---|---|
| *H04W 24/08* | (2009.01) |
| *H04L 12/26* | (2006.01) |
| *H04L 12/807* | (2013.01) |
| *H04W 48/16* | (2009.01) |
| *H04W 48/20* | (2009.01) |

(52) U.S. Cl.
CPC .......... *H04W 24/08* (2013.01); *H04L 43/028* (2013.01); *H04L 47/27* (2013.01); *H04W 48/16* (2013.01); *H04W 48/20* (2013.01)

(58) Field of Classification Search
None
See application file for complete search history.

(56) References Cited

U.S. PATENT DOCUMENTS

| | | | |
|---|---|---|---|
| 8,027,329 B2 | 9/2011 | Hafeez et al. | |
| 8,396,097 B1* | 3/2013 | Giallorenzi | H04B 1/7087 |
| | | | 375/134 |
| 9,241,299 B2* | 1/2016 | Zhao | H04W 48/16 |

(Continued)

FOREIGN PATENT DOCUMENTS

| | | |
|---|---|---|
| EP | 2391081 A1 | 11/2011 |
| WO | 2011147436 A1 | 12/2011 |

OTHER PUBLICATIONS

U.S. Appl. No. 61/611,078, filed Mar. 15, 2012, "A Receiver, a Computerized Device, a Communication Device, Methods Therein and a Computer Program Product", Drugge et al.*

*Primary Examiner* — Gregory B Sefcheck
(74) *Attorney, Agent, or Firm* — Eschweiler & Potashnik, LLC

(57) ABSTRACT

A method includes receiving a composite signal (R(k)) comprising transmissions from a plurality of cells, and identifying a plurality of candidate cells ($N_m$) based on a first detection metric ($\Lambda_m$) with respect to the composite signal (R(k)). The method also includes filtering the plurality of candidate cells ($N_m$) with respect to cell identifiers (m) of the plurality of candidate cells to obtain a plurality of filtered candidate cells ($N_m'$), and selecting from the plurality of filtered candidate cells ($N_m'$) a plurality of selected cells according to a selection criterion.

16 Claims, 10 Drawing Sheets

(56) References Cited

U.S. PATENT DOCUMENTS

| | | | | |
|---|---|---|---|---|
| 9,491,695 B2* | 11/2016 | Jeong | ................... | H04W 36/32 |
| 9,525,994 B2* | 12/2016 | Goldfarb | ................. | H04W 8/02 |
| 9,609,585 B1* | 3/2017 | Markovic | ............. | H04W 48/16 |
| 9,838,879 B2* | 12/2017 | Norrman | ............... | H04W 12/12 |
| 10,091,715 B2* | 10/2018 | Goldfarb | ................. | H04W 8/02 |
| 10,123,224 B2* | 11/2018 | Ramkumar | .......... | H04J 11/0079 |
| 2010/0054184 A1* | 3/2010 | Kishiyama | ........... | H04J 11/0069 |
| | | | | 370/328 |
| 2010/0069066 A1* | 3/2010 | Shen | ................... | H04J 11/0093 |
| | | | | 455/434 |
| 2012/0231790 A1 | 9/2012 | Lindoff et al. | | |
| 2013/0273912 A1 | 10/2013 | Xu et al. | | |
| 2014/0357268 A1* | 12/2014 | Dubey | ................. | H04W 48/16 |
| | | | | 455/434 |
| 2015/0033255 A1* | 1/2015 | Neumann | ........ | H04N 21/25891 |
| | | | | 725/34 |
| 2015/0208328 A1* | 7/2015 | Drugge | ............... | H04B 1/7083 |
| | | | | 455/434 |
| 2017/0086222 A1* | 3/2017 | Sun | .................... | H04L 43/0811 |
| 2018/0098270 A1* | 4/2018 | Bustani | ................ | H04W 24/08 |

* cited by examiner

TECHNIQUES FOR FILTERING CANDIDATE CELLS

REFERENCE TO RELATED APPLICATION

This application claims priority to German application number 10 2013 015 167.8 filed on Sep. 11, 2013.

FIELD

The disclosure relates to methods for filtering candidate cells identified from a composite signal including transmissions from a plurality of cells of a cellular network, in particular candidate cells also referred to as "ghost cells". The disclosure further relates to devices to perform such methods.

BACKGROUND

Quick and accurate detection of multiple cells surrounding the user equipment (UE) are essential to ensure the mobility and QoS of end users. In a LTE system, multiple cells need to be detected, even when a UE has no knowledge about the neighbor cells. As a practical searcher is usually unable to exclusively detect the actually existing (real) cells, non-existing (ghost) cells are often output to the next processing stages. The ghost cells will consume additional computational resources, e.g. in cell measurement. When not fully eliminated and passed to the network, the network can make a wrong decision such that the communication cannot work properly. In fact, a UE will fail to pass the network tests when it delivers a single ghost cell to the network.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
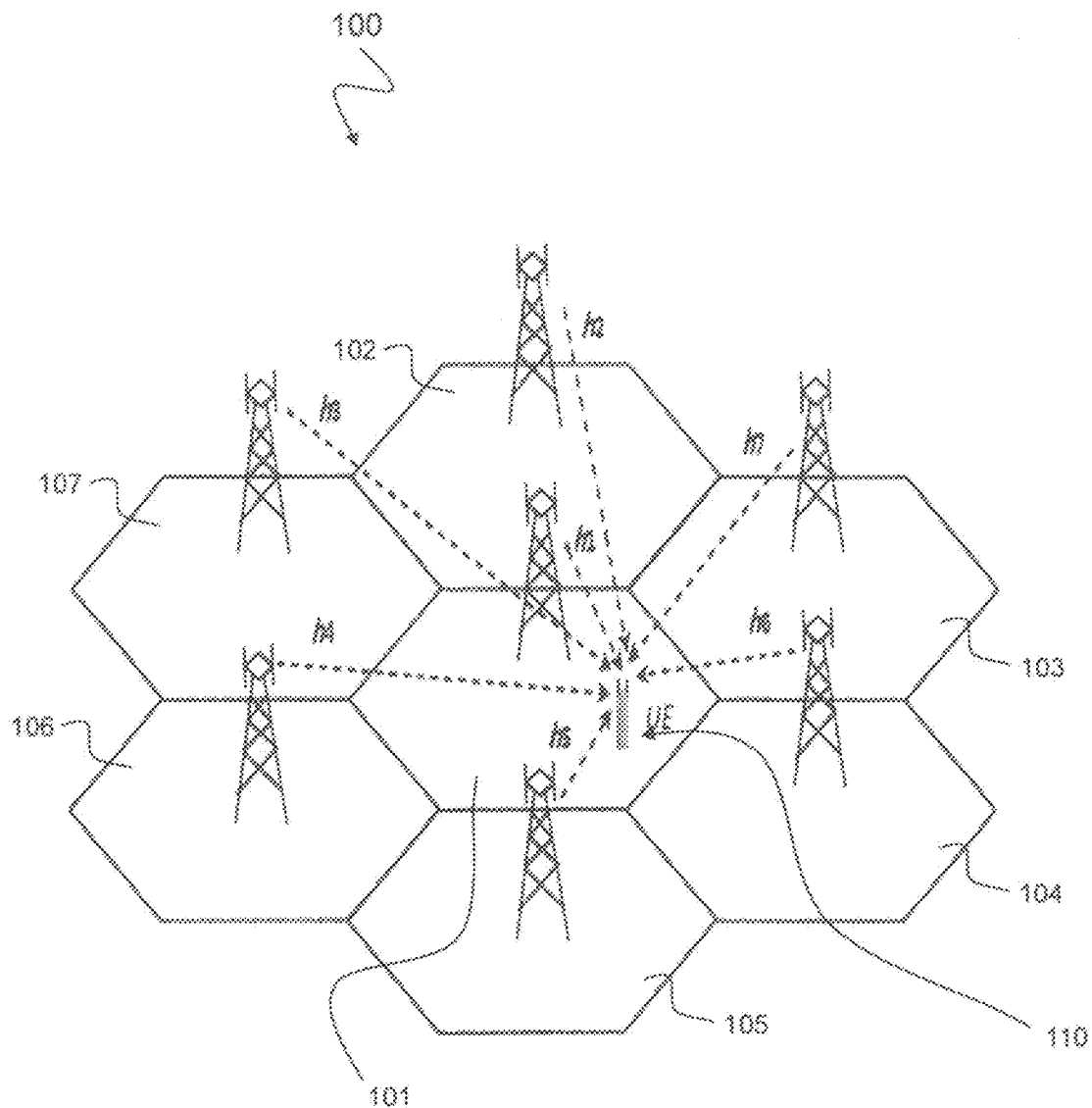
FIG. 1 is a schematic diagram illustrating a multi-cell radio communication system 100 in accordance with the disclosure.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The following terms, abbreviations and notations are used herein:
PSS: Primary Synchronization Signal,
SSS: Secondary Synchronization Signal,
LTE: Long Term Evolution,
UE: User Equipment,
RS: Reference Signal,
RE: Resource Element,
CIR: Channel Impulse Response,
OFDM: Orthogonal Frequency Division Multiplex,
CRS: Cell-specific Reference Signal,
RSRP: Reference Signal Received Power,
RSRQ: Reference Signal Received Quality,
DL: Downlink,
UL: Uplink,
SINR: Signal-to-Interference-and-Noise Ratio,
PBCH: Physical Broadcast Channel,
PRACH: Physical Random Access Channel,
TD: Time-Domain,
SCH: Synchronization Channel,
P-SCH: Primary synchronization channel,
S-SCH: Secondary synchronization channel,
PSS: Primary synchronization channel signal,
SSS: Secondary synchronization channel signal,
ZC: Zadoff-Chu,
Cell ID: cell identifier,
DFT: discrete Fourier transform,
RSSI: received signal strength indicator,
CDF: cumulative density function,
eNodeB: E-UTRAN Node B, also known as Evolved Node B,
  (abbreviated as eNodeB or eNB) is the element in E-UTRA of LTE that is the evolution of the element Node B in UTRA of UMTS. It is the hardware that is connected to the mobile phone network that communicates directly with mobile handsets (UEs).
AWGN: Additive White Gaussian Noise,
ETU70: "Extended Typical Urban model" multi-path fading propagation conditions according to 3GPP technical specification 36.101 V11.3.0 (February 2013), using a Doppler frequency of 70 Hz,
EVA: "Extended Vehicular A model" multi-path fading propagation conditions according to 3GPP technical Specification 36.101 V11.3.0 (February 2013)

The methods and devices described herein may be based on two-dimensional signal patterns, reference signals and frequency-time transforms of reference signals. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on an LTE and/or OFDM standard. The methods and devices described below may further be implemented in a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in compliance to mobile standards such as e.g. the Long Term Evolution (LTE) standard. LTE (Long Term Evolution), marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements. The standard is developed by the 3GPP (3rd Generation Partnership Project) and is specified in its Release 8 document series, with enhancements described in Releases 9, 10, 11 and higher.

In the following, Orthogonal Frequency-Division multiplexing (OFDM) systems are described. OFDM is a scheme for encoding digital data on multiple carrier frequencies. OFDM has developed into a popular scheme for wideband digital communication, whether wireless or over copper wires, used in applications such as digital television and audio broadcasting, DSL broadband internet access, wireless networks, and 4G mobile communications. OFDM is a Frequency-Division Multiplexing (FDM) scheme used as a digital multi-carrier modulation method. A large number of closely spaced orthogonal sub-carrier signals may be used to carry data. The orthogonality may prevent crosstalk between sub-carriers. The data may be divided into several parallel data streams or channels, one for each sub-carrier. Each sub-carrier may be modulated with a conventional modulation scheme (such as quadrature amplitude modulation or phase-shift keying) at a low symbol rate, maintaining total data rates similar to conventional single-carrier modulation schemes in the same bandwidth. OFDM may be essentially identical to Coded OFDM (COFDM) and Discrete Multi-Tone modulation (DMT).

The methods and devices described herein may be based on synchronization and cell search. In cellular systems, synchronization and cell search may be the very first task when a user equipment (UE) tries to establish a connection with a base station, for example, an evolved Node B (eNB) in terms of a mobile communication standard, such as the 3GPP LTE and LTE-A (advanced). For LTE and LTE-A systems, synchronization may be accomplished first in downlink (DL) and then in uplink (UL). Concretely, the UE may perform an initial time and frequency offset estimation by detecting synchronization signals of eNBs. When this is successful, the UE can acquire the frame structure of the DL signal and cell identities/IDs of strong cells, decoding the physical broadcast channel (PBCH) signal, and read basic system information (e.g. DL bandwidth, etc). After this, the UE may transmit back the physical random access channel (PRACH) signal. The eNB can then detect the PRACH, estimate the transmit timing of the UE, identify the UE, etc., in order to establish the connection with the UE.

A UE may have no knowledge about the cells surrounding it according to a mobile communication standard, such as 3GPP TS 36.133, V11.3.1, February 2013. Therefore, a cell search process may consist of two stages, namely, cell identification and cell measurement. During the cell identification, a number of, for example, the most likely cells may be detected and recorded. Then, the received power or quality, such as the reference signal received power (RSRP) and reference signal received quality (RSRQ) of the identified cells may be measured. The cells with high RSRP and RSRQ may be considered as the valid cells and reported to the network. In an example of such a method for cell search, the identified cells may afterwards be confirmed through the cell-specific reference signal (CRS) using a RSRP-like metric.

In the following, ghost cells and valid cells are described. Due to strong noise, interference, and/or limited amount of available data, some ghost cells may be recorded. Here a ghost cell is referred to as a non-existing cell or a very weak cell with which the UE is unable to connect. A cell which is not a ghost cell is also called a valid (or real) cell. For the same reasons, the cell measurement may not be done accurately, especially for low bandwidths where very limited CRSs are available. E.g. for 1.4 MHz bandwidth TD-LTE, the number of the available CRS resource elements (REs) may be even less than those of the available secondary synchronization signal (SSS). The default bandwidth for a cell searcher may be defined as the lowest bandwidth, e.g. 1.4 MHz. Consequently, some of these ghost cells may be wrongly measured to have high RSRP or RSRQ and finally reported to the network. In these situations, the network can make a wrong decision such that the UE or network may not work properly. To prevent such events happening, 3GPP defines specific test cases. In fact, a UE may fail to pass the 3GPP tests when it delivers even one ghost cell to the network. On the other hand, a mobile communication standard, such as 3GPP also mandates that a UE shall be able to detect and report any existing (real) cells whose received power and signal-to-interference-and-noise ratio (SINR) are above certain thresholds. For example, an intra-frequency cell shall be detectable when its received SINR is above −6 dB (Rel. 8), −7.5 dB (Rel. 10), or −11.07 dB (Rel. 11) as defined by 3GPP TS 26.133, V11.3.1, February 2013.

In the following, cell group ID and physical layer ID are described. A total of 504 cell IDs are defined in LTE/LTE-A as $$N_{ID}^{cell} = 3N_{ID}^{(1)} + N_{ID}^{(2)} \quad (1)$$

where $N_{ID}^{(1)} \in \mathcal{N}_{ID}^{(1)}$ ($\mathcal{N}_{ID}^{(1)} = \{0, 1, \ldots, 167\}$) is the cell group ID and $N_{ID}^{(2)} \in \mathcal{N}_{ID}^{(2)}$ ($\mathcal{N}_{ID}^{(2)} = \{0, 1, 2\}$) the physical layer ID (sometimes called the sector ID) within a cell group according to 3GPP TS 36.211, V8.4.0, September 2008.

The information on $N_{ID}^{(2)}$ and $N_{ID}^{(1)}$ may be carried through two DL synchronization channels (SCHs) of an eNB, i.e. the primary synchronization channel (P-SCH) signal (PSS) and secondary synchronization channel (S-SCH) signal (SSS), respectively. For simplicity, SCH is used to denote a synchronization channel and a synchronization channel signal. For LTE FDD, the PSS may be embedded in the last OFDM symbol and the SSS in the second last OFDM symbol of the subframe 0 and 5 in each radio frame. For LTE TDD, the PSS may be in the 3rd OFDM symbol of the subframe 1 and 6 and the SSS in the last OFDM symbol of the subframe 0 and 5 (see 3GPP TS 36.211, V8.4.0, September 2008). Once a UE successfully detects and decodes the PSS and SSS, the cell ID of the eNB can be determined.

The PSS may be chosen from a class of the Zadoff-Chu (ZC) sequences defined as $$d_u(k) = e^{-j\frac{\pi u k(k+1)}{N_{ZC}}} \quad 0 \le k < N_{ZC} \tag{2}$$

where $N_{ZC}$ is the ZC sequence length and u is the ZC root index relatively prime to $N_{ZC}$. In LTE, $N_{ZC}$=63 may be chosen for PSS in frequency domain. $d_u(31)$ may correspond to DC subcarrier and may be not transmitted. $N_{ID}^{(2)}$=0, 1, 2 may be represented by the PSSs with three different ZC root indices u=25, 29, 34, respectively, and decoding $N_{ID}^{(2)}$ means to determine u.

The SSS may have also 62 non-zero elements in frequency domain. These may be an interleaved concatenation of two length-31 binary sequences, each taking 31 different values corresponding to 31 cyclic shifts of an m-sequence. The shifts may be derived from $N_{ID}^{(1)}$. The two length-31 sequences may then be scrambled with the sequences derived depending on $N_{ID}^{(2)}$. Contrary to the PSS, the SSS in subframe 0 and 5 may be different from each other, which can be used to distinguish the subframe 0 from the subframe 5, and thus to identify the begin of frame. k=0 is the index of the DC subcarrier, the frequency domain SSS symbol of the cell m can be written as $$S_m(k) = \begin{cases} \pm 1 & k \in \mathcal{K} \\ 0 & \text{otherwise} \end{cases} \tag{3}$$

where $K:=\{-K_1, \ldots, -1, 1, \ldots, K_1\}$ is the set of the subcarrier indices of SSS ($K_1$=31).

The methods and devices described herein may be based on the system model 100 illustrated in FIG. 1 and described in the following. The set of the total number of cells is $N_T$. The target is to find within $N_T$ the set $N_M$ of for example, the M existing cells 101, 102, 103, 104, 105, 106, 107 surrounding the UE 110. M itself may be needed to be determined as well. The number of the cells in $N_T$ and $N_M$ is denoted as $|N_T|$ and $|N_M|$, respectively. Apparently, the relation $|N_M|=|N_T|$ holds. For a mobile communication standard, such as LTE, $|N_T|$=504, where 504 may be the total number of cells with distinct cell IDs. In case that the UE 110 knows that only a subset of 504 cells is to search, then $|N_T| \le 504$ can hold.

A synchronized OFDM system with a DFT size N and CP length G may be used. Given the transmitted time domain SSS $s_m(n)$ from the m-th cell with a delay $\tau_m$ and an equivalent overall channel impulse response (CIR) $h_m(l)$ (l=0, 1, . . . , $L_m$−1, $L_m$=maximum channel delay spread), the UE received time domain SSS r(n) in an OFDM symbol, after removing CP, can be written as $$r(n) = \sum_{m \in N_T} \sum_{l=0}^{L_m-1} h_m(l) s_m(n - \tau_m - l) + z(n) \tag{4}$$

where z(n) may be a complex-valued zero-mean AWGN process.

After N-point DFT, the corresponding received signal, i.e. the SSS symbol, in frequency domain may become $$R(k) = \sum_{m \in N_T} H_m(k) S_m(k) e^{-j\frac{2\pi \tau_m k}{N}} + Z(k) \tag{5}$$

where $k \in K$ and $Z(k) \sim CN(0, \sigma_Z^2)$. For one SSS symbol, $K=\{-31, \ldots, -1, 1, \ldots, 31\}$, and the number of the subcarriers $K:=|K|=62$. R(k), $s_m(k)$, $H_m(k)$ and Z(k) may be the N-point DFT of r(n), $s_m(n)$, $h_m(n)$ and z(n), respectively. Notice that equation (5) may be valid for any input signal $S_m(k)$, such as PSS, and/or SSS, and/or CRS (cell-specific reference signal), etc.

The cell search rule can be formulated as follows: A cell $m \in N_M$ if $P_m \ge P_{th}$ for $\forall$ $m \in N_M$, where $P_m := E\{|H_m|^2\}$ is the UE received power from the cell m, and $P_{th}$ a given threshold derived, e.g. according to the 3GPP requirement. In terms of 3GPP LTE, when the transmit signal is the CRS, $P_m$ may be the so-called reference signal received power (RSRP) which may be defined as the linear average over the power contributions of the resource elements (REs) that carry cell-specific reference signals. When the transmit signal is the synchronization signal (PSS and SSS), $P_m$ may be called the synchronization signal received power (SCH_RP). In other words, cell search based on synchronization signal may be defined as finding the M cells having the largest SCH_RP.

In addition to RSRP, other metrics (measurements) like the RSRQ (reference signal received quality) and the received SINR may also be used in LTE/LTE-A as criteria for cell identification, measurement and (re)selection. RSRQ may be defined as the ratio of RSRP and RSSI (received signal strength indicator), where the RSSI may be defined as the linear average of the total received power observed in OFDM symbols containing reference symbols. Mathematically, the RSSI may be equal to $E\{|R|^2\}$ when the transmit signal is the CRS. When the transmit signal is the synchronization signal, $E\{|R|^2\}$ is referred here as the SCH_SI (received synchronization signal strength indicator).

The methods and devices described herein may be based on coherent and non-coherent cell detection and metrics based thereon as described in the following. It may first be assumed that the pilot signals of different cells are uncorrelated with each other so that the cells can be distinguished by these pilot signals (Correlated pilot signals will be described below). In order to detect a cell, for example the cell m, the signals of all other cells can be assumed as noise. Moreover, the cell m may be considered whose timing is already pre-determined at UE (e.g. it can be assumed $\tau_m$=0 or assumed that its phase effect is absorbed into $H_m(k)$), and equation (5) can be rewritten as $$R(k) = H_m(k) S_m(k) + Z_m(k) \tag{6}$$

In this simplified case, the index k in equation (6) may not necessarily be the subcarrier index. It can be considered as an index for any input data sample $S_m(k)$ and output data sample $R(k)$, in frequency domain or in time domain. It can easily be seen that $R(k) \sim CN(H_m(k)S_m(k), \sigma_{Zm}^2)$ is complex Gaussian, with $\sigma_{Zm}^2$ being the variance of $Z_m(k)$. To simplify the analysis, it can be further assumed that $Z_m(k)$ is independent of $Z_m(l)$, $k \neq l$, and has $\sigma_{Zm}^2 \approx \sigma_Z^2$. As such, equation (6) becomes a linear model.

The cross-correlation between the signal A and B may be defined as $$\mathrm{corr}\{A, B\} := \sum_k A^*(k) B(k) \qquad (7)$$

It is assumed that K data samples are available. It can be denoted $R = [R(0), R(1), \ldots, R(K-1)]^T,$ $H_m = \mathrm{diag}(H_m(0), H_m(1), \ldots, H_m(K-1)),$ $S_m = [S_m(0), S_m(1), \ldots, S_m(K-1)]^T,$ $Z_m = [Z_m(0), Z_m(1), \ldots, Z_m(K-1)]^T. \qquad (8)$ Then it holds $R \sim CN(H_m S_m, \sigma_Z^2 I)$, with the probability density function $$p(R; S_m) = \frac{\exp(-(R-\mu)^H \Sigma^{-1} (R-\mu))}{\pi^K \det(\Sigma)} \qquad (9)$$

where the mean vector is $\mu = H_m S_m$, and the covariance matrix is $\Sigma = \sigma_Z^2 I$ (I is the identity matrix).

The ML (maximum likelihood) estimate of the cell m which is equivalent to searching for the pilot $$\hat{S}_m = \underset{S_m}{\mathrm{argmax}} \ \ln p(R; S_m)$$

can be formulated as $$\hat{S}_m = \arg \min_{S_m} (R - H_m S_m)^H (R - H_m S_m) \qquad (10)$$
$$= \arg \min_{S_m} \{R^H R - R^H H_m S_m - (R^H H_m S_m)^H + S_m^H H_m^H H_m S_m\}$$

After a few manipulations, one obtains $$\hat{S}_m = \arg \max_{S_m} \left\{ Re \sum_k (2 H_m(k) S_m(k) R(k)^* - |H_m(k) S_m(k)|^2) \right\} \qquad (11)$$

$$\hat{S}_m = \arg \max_{S_m} \left\{ Re \sum_k (H_m(k) S_m(k) R(k)^*) \right\} \qquad (12)$$

The last equation follows from the fact that for a given channel $H_m$, $$\sum_k |H_m(k) S_m(k)|^2 = \sum_k |H_m(k)|^2$$

may be constant, since for the pilot signal considered, $|S_m(k)|=1$ may hold. Here, equation (12) is referred to as the coherent detection (estimation) for $S_m$. In practice, however, the channel may not be known. To circumvent this problem, it may be assumed that the channel $H_m$ is random but flat for the considered K data samples. In addition, to avoid the phase shift caused by $H_m$, equation (12) may be modified as $$\hat{S}_m = \arg \max_{S_m} \Lambda_m \qquad (13)$$

where $$\Lambda_m := E \left\{ \left| \sum_k (S_m(k) R(k)^*) \right|^2 \right\} = E\{|\mathrm{corr}\{S_m, R\}|^2\}$$

is the metric based on correlation, and the expectation (statistical averaging) is taken for channel and noise. Detection based on this equation is referred here to as the "non-coherent detection". Notice that any detection metric having a one-to-one mapping with $\Lambda_m$ can be used to substitute $\Lambda_m$, such as $$\hat{S}_m = \arg \max_{S_m} \{\Lambda_m^{1/2}\}.$$

The methods and devices described herein may be based on joint non-coherent cell detection and metrics based thereon as described in the following. For a mobile communication standard, such as LTE, the pilot signals PSS, SSS and CRS may be different for different cells, and can be used for cell search and measurement. Except for some cases (not discussed here) in which the channels of the PSS and its neighboring SSS are similar, such as in LTE FDD where the cells may be asynchronous, the channels for PSS, SSS and CRS may usually not be available. This puts limitation on the applicability of the coherent detection based method. For simplicity, $\Lambda_{m,PSS}$, $\Lambda_{m,SSS}$ and $\Lambda_{m,CRS}$ is used to denote the correlation metric $\Lambda_m$ computed, e.g. using equation (13), for PSS, SSS and CRS, respectively. $\Lambda_{m,PSS+SSS+CRS}$ is the metric for the combined or concatenated signal PSS, SSS and CRS, etc. Apparently, when the channels of the PSS, SSS and CRS are not the same, $\Lambda_{m,PSS+SSS+CRS}$ computed using equation (13) may not be an appropriate metric. But when the channels for considered REs of the PSS remain roughly the same, $\Lambda_{m,PSS}$ obtained using equation (13) may be a suitable metric. Similarly, $\Lambda_{m,SSS}$ can be computed for the SSS whose REs have the similar channel. Then, the combined metric can be used, for example, $\Lambda_{m,PSS}+\Lambda_{m,SSS}$, as the detection metric. The detection may then also be referred to as the joint non-coherent PSS-SSS detection. Note that due to the varying channel for CRS REs and the high computational complexity, $\Lambda_{m,CRS}$ may not be used for cell identification.

The methods and devices described herein may be based on pilot signals and reference signals and metrics based thereon as described in the following. The above analysis was done by assuming that different cells' pilot signals such as PSS, SSS or CRS are not correlated with each other. This is, however, not always true. E.g. for SSS, the normalized correlation coefficient between two SSS sequence m and n may be $|\rho_{S'_m, S'_n}|=0.03\sim0.48$ (m≠n). It is assumed that the delays $\tau_m$ have been estimated and $$S'_m(k) := S_m(k) e^{-j\frac{2\pi \tau_m k}{N}}$$

is defined. Considering the case $|N_E|=2$ cells, equation (5) can be written as $$R(k) = H_0 S'_0(k) + H_1 S'_1(k) + Z(k) \tag{14}$$

To simplify the analysis, the flat-fading channel is considered here where the channel may remain roughly invariant within the considered subcarriers. Then the subcarrier index k can be omitted.

According to equation (14), one can obtain $$\text{corr}\{S'_1, R\} = \text{corr}\{S'_1, H_0 S'_0 + H_1 S'_1 + Z\} = \tag{15}$$
$$H_0 \text{corr}\{S'_1, S'_0\} + H_1 \text{corr}\{S'_1, S'_1\} + \text{corr}\{S'_1, Z\}$$

The channel $H_0$, $H_1$ and noise Z may be statistically uncorrelated and may have zero mean, i.e. $E\{Z\}=0$, $E\{H_0^* H_1\}=0$. Then the metric $$\Lambda_1 := E\{|\text{corr}\{S'_1, R\}|^2\} \tag{16}$$
$$= P_0 |\text{corr}\{S'_1, S'_0\}|^2 + P_1 K^2 + \sigma_z^2 K$$

is obtained, where for PSS, SSS or CRS resource element (RE) $S'_m(k)$, $|S'_m(k)|=1$ holds. Thus, it holds:

$$\text{corr}\{S'_m, S'_m\} = K \tag{17}$$

$$E\{|\text{corr}\{S'_m, Z\}|^2\} = K\sigma_Z^2 \tag{18}$$

Similarly, the metric $$\Lambda_0 := E\{|\text{corr}\{S'_0, R\}|^2\} = P_1 |\text{corr}\{S'_0, S'_1\}|^2 + P_0 K^2 + \sigma_Z^2 K \tag{19}$$

can be obtained.

$P_0$ and $P_1$ in equations (16) and (19) may be the desired metric SCH_RP to identify cell 0 and 1, respectively. In practice, $P_0$ and $P_1$ are usually not available. In that case, the left side of equations (16) and (19) may be used, i.e. the metric $\ddot{E}_0$ and $\ddot{E}_1$, to identify cells.

For $\text{corr}(S'_m, S'_n) \approx 0$, $\forall$ m≠n, the metrics in equations (16) and (19) may reduce to $$\Lambda_1 = P_1 K^2 + \sigma_Z^2 K \tag{20}$$

$$\Lambda_0 = P_0 K^2 + \sigma_Z^2 K \tag{21}$$

It can be seen that the correlation-based metric $\Lambda_0$ and $\Lambda_1$ have a one-to-one relation to SCH_RP. They are therefore the desired equivalent ideal metrics for cell identification. This may also be true for the more than two cell scenarios. In other words, when the synchronization signals are uncorrelated with each other, the metric $\Lambda_0$ and $\Lambda_1$ can be directly used for cell identification. The cell identification rule may look like as follows: The cell m will be identified as a valid cell, when $\Lambda_m \geq \Lambda_{th}$ for $\forall m \in N_M$. This rule, however, may not be suitable for $\text{corr}(S'_m, S'_n) \neq 0$, since the metric $\Lambda_m$ is usually not equivalent to the ideal metric $P_m$. Instead, a modified metric, say $\Lambda'_m$, which is equivalent to $P_m$, may be used. E.g. when $\Lambda_0 \gg \Lambda_1$ (or $P_0 \gg P_1$), the following modified metric can be employed:

$$\Lambda'_0 := P_0 K^2 + \sigma_Z^2 K \approx \Lambda_0 \tag{22}$$

$$\Lambda'_1 := P_1 K^2 + \sigma_Z^2 K = \Lambda_1 - (\Lambda'_0 - \sigma_Z^2 K)|\rho_{S'_1, S'_0}|^2 \tag{23}$$

Figure 2:
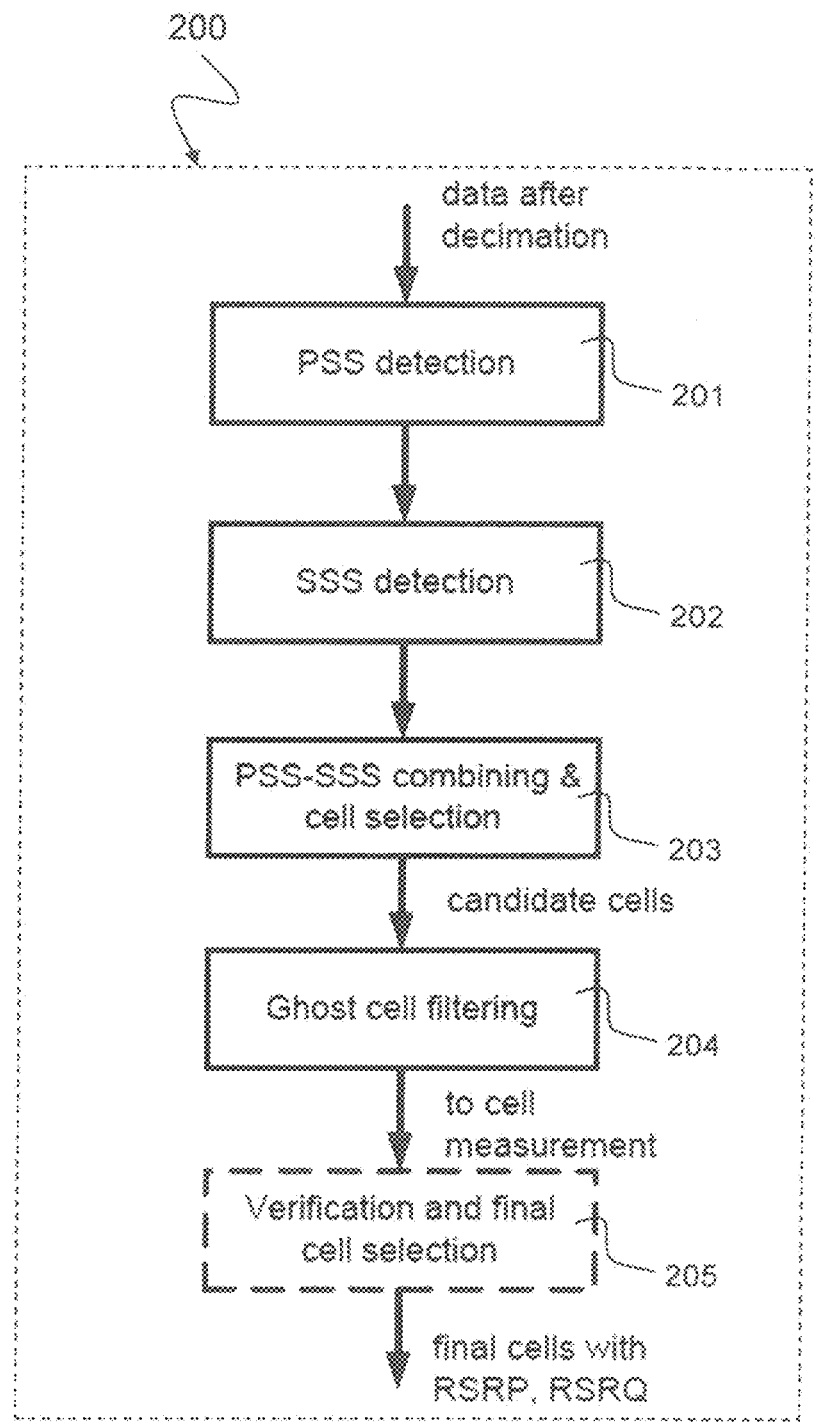
FIG. 2 is a schematic diagram illustrating a method 200 in accordance with the disclosure for performing a cell search.

FIG. 2 is a schematic diagram illustrating a method 200 in accordance with the disclosure for performing a cell search. The method 200 may include the following blocks:
PSS detection 201 over several half-frames;
SSS detection 202 over several half-frames;
PSS-SSS combining & cell selection 203 to choose (e.g. 15) candidate cells with the highest metric;
Ghost cell filtering 204 to select the most likely valid cells; and
Verification and final cell selection 205 to select final cells according to the measured RSRP, RSRQ, SINR etc.

The ghost cell filtering 204 may be designed to eliminate as many ghost cells as possible within the candidate cells and at the same time to maintain the high detection rate. It becomes clear from the flow chart of FIG. 2 that such a ghost cell filter algorithm 204 can also be used for other cell searchers, such as the LTE cell searcher based on coherent detection.

Figure 3A:
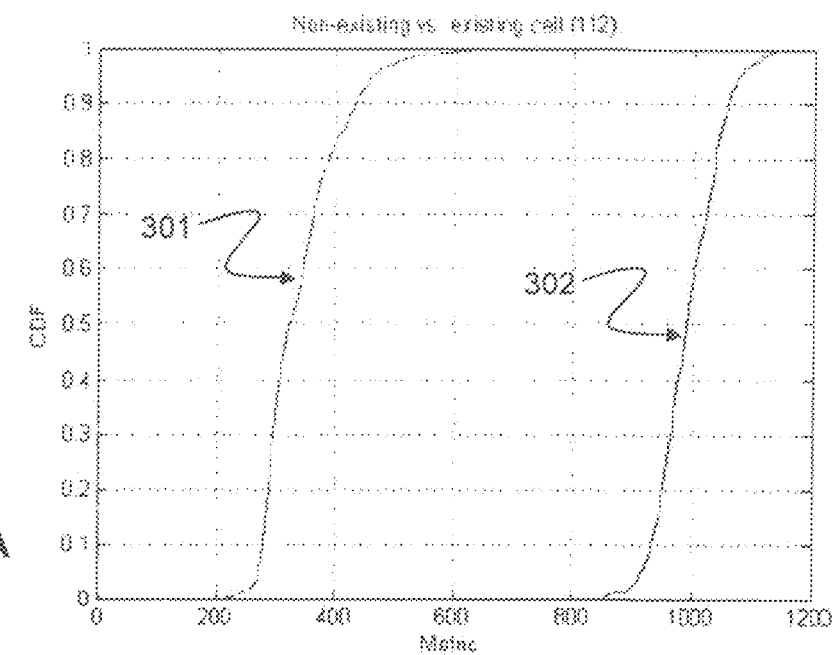
FIGS. 3A and 3B are diagrams illustrating exemplary cumulative density functions (CDF) of detection metric for non-existing ghost cells 301, 311 and an existing cell 302, 312 for an AWGN channel 300a (FIG. 3a) and an ETU70 channel 300b (FIG. 3b) in accordance with the disclosure.
Figure 3B:
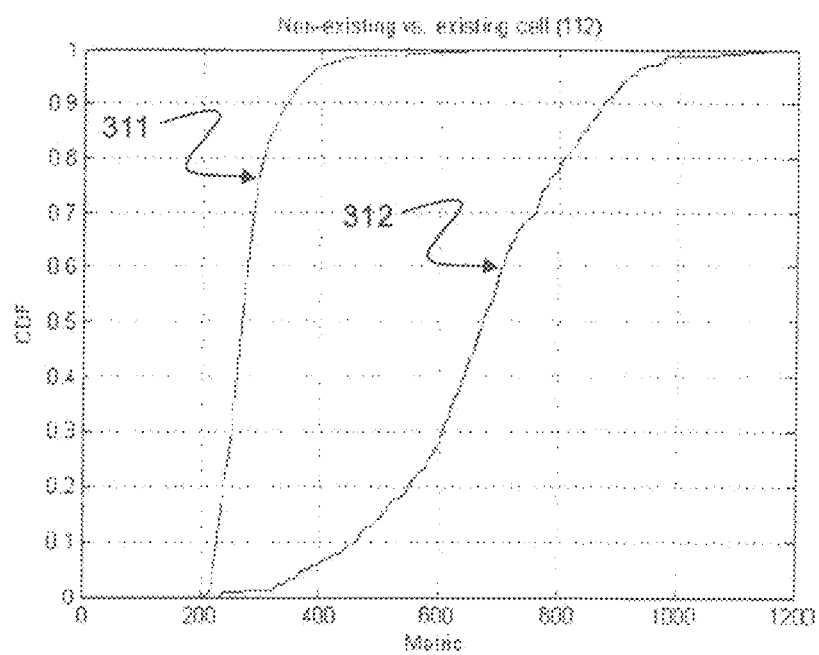

FIGS. 3a and 3b are diagrams illustrating exemplary cumulative density functions (CDF) of detection metric for non-existing ghost cells 301, 311 and an existing cell 302, 312 for an AWGN channel 300a and an ETU70 channel 300b in accordance with the disclosure. The detection metric, e.g. $\Lambda_m = \Lambda_{m,SSS}$, or $\Lambda_m = \Lambda_{m,PSS} + \Lambda_{m,SSS}$, etc. as described above, can directly be used to classify a cell as a real or ghost cell. One can select among certain cells having the highest metric, only the cells whose metric is above a pre-determined threshold, for example $\ddot{E}_{th1}$.

Such a detection metric, however, may be strongly dependent on the channel and the interference type, so that it may only work in limited circumstances, e.g. when there is only one dominant cell, or when the channel is AWGN or not varying.

In the example of FIG. 3, the ghost cells 301, 311 may have consistent metric values ranging from 200 to 700, for example, for both AWGN (=additive white Gaussian noise) 300a and ETU70 (=extended typical urban with 70 Hz Doppler frequency shift) 300b channels. But the existing real cell may have the metric values 302 ranging from 800 to 1200, for example, in the case of AWGN 300a, and the metric values 312 ranging from 200 to 1200, for example, in the case of ETU70 200b. If $\ddot{E}_{th1}=700$ is set, then for AWGN channel, using $\ddot{E}_m > \ddot{E}_{th}$ may detect all existing real cells and eliminate all ghost cells. But for ETU70, using the same thresholding may lead to a detection rate of about only 40% for the real cells, although all ghost cells can be removed. By lowering the threshold, a higher detection rate may be obtained, but also higher false alarm rate (increased number of the ghost cells). Here, it becomes clear that using fixed thresholding can work for some channel (e.g. AWGN) but may often fail for other channels (e.g. ETU). An adaptive thresholding method may be necessary.

The effect of the pilot correlation has been considered and properly removed in the metric, as shown above. This may be equivalent to consider the metric where the pilot correlation equals zero. According to equation (20) or (21), the normalized metric for cell m may be obtained as:

$$\lambda_m := \Lambda_m / K^2 = P_m + \sigma_Z^2 / K \tag{24}$$

which may contain the received power $P_m$ of the cell m, and a part representing the equivalent noise. For a ghost cell m, $P_m=0$, and its normalized metric $$\lambda_Z := \sigma_Z^2/K \quad (25)$$

is equal to the equivalent noise. Making use of this fact, the equivalent noise can be estimated as the lowest detection metric of cells containing ghost cells. For instance, it may be known that within the cell set $N'_M$ there is at least one ghost cell, then the equivalent noise can be estimated as:

$$\lambda_z = \min_{m \in N'_m} \{\lambda_m\} \quad (26)$$

It is assumed that all cells with $\lambda_m < \lambda_{th1}$ will be filtered out. Different from the fixed-thresholding method, $\lambda_{th1}$ is chosen adaptively, namely, depending on the equivalent noise, e.g. $\lambda_{th1} = 2\lambda_Z$. This may be equivalent to use a new metric similar to SNR, i.e. $\lambda_m/\lambda_Z < 2$, for ghost cell detection.

Whether a signal is detectable or not may be mainly dependent on its SINR. For a mobile communication standard, such as LTE/LTE-A, the instantaneous SINR may be formally defined as $\hat{E}s/Iot$, such as the SCH $\hat{E}s/Iot$ (=$\hat{E}s/Iot$ for SCH) and the RSRP $\hat{E}s/Iot$ (=$\hat{E}s/Iot$ for CRS), where $\hat{E}s$ is the received energy per RE during the useful part of the OFDM symbol at the UE antenna connector, and Iot is the received power spectral density of the total noise and interference for a certain RE as measured at the UE antenna connector. $\hat{E}s/Iot$ may be one of the side conditions given e.g. by a test equipment, and in general may not be available for a receiver. An accurate estimation of $\hat{E}s/Iot$ at the receiver side may be difficult if not impossible, as it may depend on the transmit signals and the channels of the cells involved.

Here, a metric is introduced called the pseudo-SINR. Specifically for the synchronization signal (SCH) of the cell $m \in N_M$, the pseudo-SINR may be defined, according to equations (24) and (25), as $$SINR_m := (\lambda_m - \lambda_Z) \bigg/ \bigg( \lambda_Z + \sum_{n \neq m, n \in N_m} (\lambda_n - \lambda_Z) \bigg) \quad (27)$$

The pseudo-SINR can be derived using any metric which has a one-to-one relation with $\lambda_m$, e.g. $\Lambda_m$. When $\Lambda_Z$ denotes $\Lambda_m$ for $P_m=0$, then one obtains:

$$SINR_m = (\Lambda_m - \Lambda_Z) \bigg/ \bigg( \Lambda_Z + \sum_{n \neq m, n \in N_m} (\Lambda_n - \Lambda_Z) \bigg) \quad (28)$$

As the valid cell set $N_M$ may be unknown before the ghost cells are eliminated, as a rule of thumb, one can first consider that the interference is only from a few (e.g. two) of the strongest cells. This method, although simple, works surprisingly well, as found in simulations. $\lambda_m$ may be assumed being ordered such that $\lambda_0 \geq \lambda_1 \geq \lambda_2 \geq \ldots$, then the SCH SINR can be calculated for example as $$SINR_0 = (\lambda_0 - \lambda_Z) \bigg/ \bigg( \lambda_Z + \sum_{n=1,2} (\lambda_n - \lambda_Z) \bigg) \quad (29)$$

$$SINR_1 = (\lambda_1 - \lambda_Z) \bigg/ \bigg( \lambda_Z + \sum_{n=0,2} (\lambda_n - \lambda_Z) \bigg) \quad (30)$$

$$SINR_m = (\lambda_m - \lambda_Z) \bigg/ \bigg( \lambda_Z + \sum_{n=0,1} (\lambda_n - \lambda_Z) \bigg), \forall m > 1 \quad (31)$$

A basic rule can be formulated as: A cell m is a ghost cell when SCH $SINR_m <$ SCH $SINR_{th}$. For a mobile communication standard, such as LTE Rel. 8, the threshold SCH $SINR_{th}$ can be set, for example to −9 dB. For LTE, the SCH SINR defined above may be based on the power of the synchronization signals (SSS as well as PSS) alone. SCH SINR may be not equal to the SCH $\hat{E}s/Iot$, unless the SCHs signals from all cells are strictly time synchronized at the UE. In this case, one cell's SCH may be only interfered by other cells' SCHs. When cells are asynchronous, one cell's SCH may likely to be interfered by other cells' downlink user data, etc., which may be dependent on the cell load, timing offset of cells, and so on. That's why the term pseudo-SINR instead of the SINR is used in this disclosure.

The SCH $SINR_m$ defined above may approximately represent the average SINR of a cell when all cells have the same amount of load, e.g. when all cells are fully loaded (i.e. all REs of the cell m have the same power as the synchronization signal of the cell m). In other words, it may roughly be the worst case SINR that the REs of that cell may experience. Consequently, the threshold SCH $SINR_{th}$ can be set corresponding to the worst case SINR.

For cells having different loads, the SINR of some portion (in time or frequency domain) of the signal of the cell m can be higher than SCH $SINR_m$. For the signal $x_m(t)$ of the target cell m, this may be especially true, when the signal, for example $x_0(t)$, of the strongest interfering cell 0, is not transmitting at that moment. Since the synchronization signal may be transmitted all the time, the pseudo SCH SINR can always be computed during cell identification. Especially for the non-coherent detection cell searcher, all metrics $\hat{E}_m$ may be available, hence the SCH SINR can easily be derived as a by-product.

The synchronization signal may be designated for cell search. In this sense, the pseudo-SINR derived from the synchronization signal may be a reasonable parameter for valid cell identification and ghost cell removal, as also justified in this disclosure.

RSRP, RSRQ, RSSI of a cell m may be the parameters computed during cell measurement using the CRSs of the cell m. They may be the standard conventional parameters to be reported by a UE to the network. Based on RSRP, RSRQ, RSSI, the parameter RSRP $\hat{E}s/Iot$ can be further computed. All these parameters can be used, e.g. for cell (re)selection.

SCH SINR and RSRP, RSRQ, RSRP $\hat{E}s/Iot$, may be based on different data and also may characterize different aspects of the transmission environment. They may complement each other. It has shown that with the SCH SINR as defined above, most ghost cells can be eliminated at the early cell identification stage. A couple of remaining ghost cells can then be easily filtered out in the cell measurement stage, for example by thresholding the RSRP, RSRQ or RSRP $\hat{E}s/Iot$.

RSRP, RSRP $\hat{E}s/Iot$ and so on may be dependent on the load of the cells. Similar to the SCH SINR defined above, the RSRP SINR (=the pseudo-SINR for the CRS) can also be defined and computed which may be independent of the system load and may equal approximately to the worst case SINR (for which all cells have the same load). When the interfering cells are not much loaded for the time t, for example, the instantaneous RSRP Ês/Iot of the target cell m for the time t can be smaller than the RSRP SINR. Similar to SCH SINR, the RSRP SINR may also be a reasonable parameter which can be employed to filter out the ghost cells.

Figure 4A:
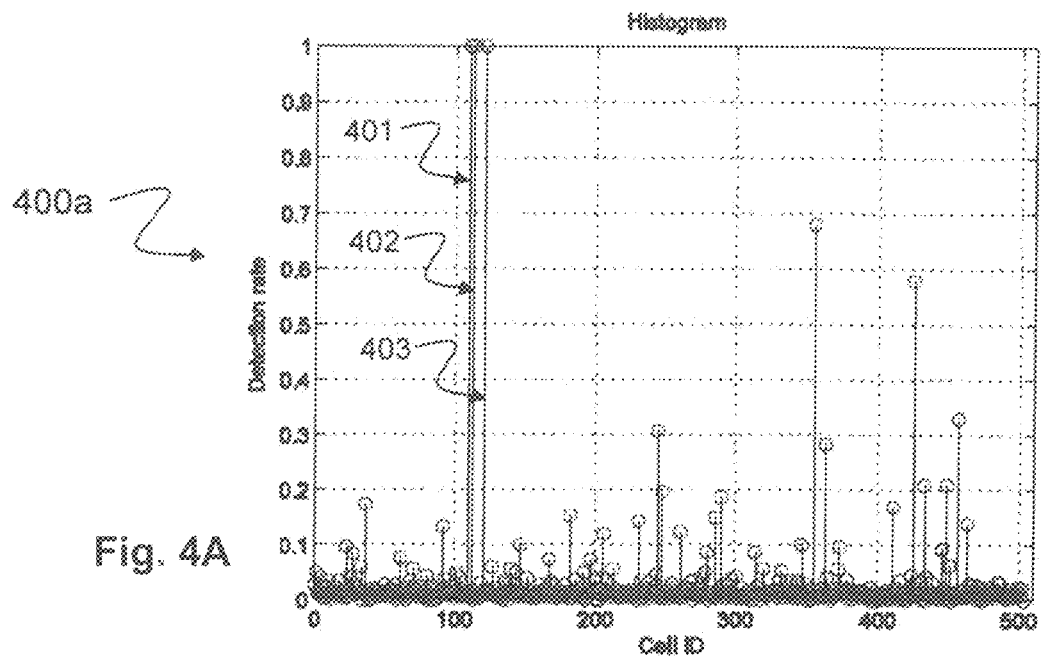
FIGS. 4A and 4B are histograms 400a, 400b illustrating detection rates of valid cells and ghost cells before ghost cell filtering for AWGN channel 400a and for ETU70 channel 400b in accordance with the disclosure.
Figure 4B:
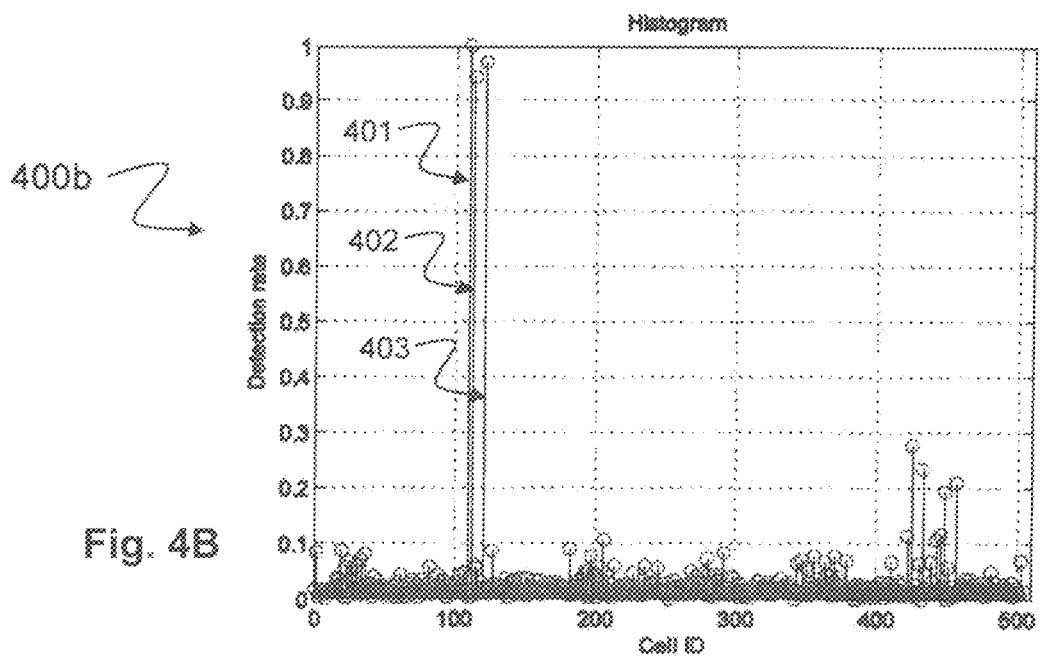

FIGS. 4a and 4b are histograms 400a, 400b illustrating detection rates of valid cells and ghost cells before ghost cell filtering for AWGN channel 400a and for ETU70 channel 400b in accordance with the disclosure. A ghost cell caused by random interference may appear randomly. As there may be 504 different physical cell IDs, a valid weak cell of a fixed physical cell ID may occur more frequently than a ghost cell of a certain cell ID. According to FIGS. 4a and 4b, most ghost cells may have a detection rate lower than 30%, where the detection rate is the rate at which a cell belongs to the set of the 15 cells having the highest detection metric. In FIGS. 4a and 4b the valid cells 401, 402, 403 have the ID 109, 112 and 120 which have also high detection rates.

There are a few ghost cells which can occur frequently. A detailed analysis has shown that a frequently occurring ghost cell may be generated not by noise but mainly due to the high correlation of its synchronization signal with the interfering signals from other strong cells. The effect of the correlation of the synchronization signals may be significantly reduced, such that only few frequently occurring ghost cells remain. Based on this, a relatively weak cell can be declared as valid when the occurring frequency of its cell ID is above a certain threshold during the last several detection trials. Weak cells with low occurring frequency may be declared as ghost cells and then eliminated. Based on this, a simple ghost cell detection algorithm may be designed as described below with respect to FIG. 5.

Figure 5:
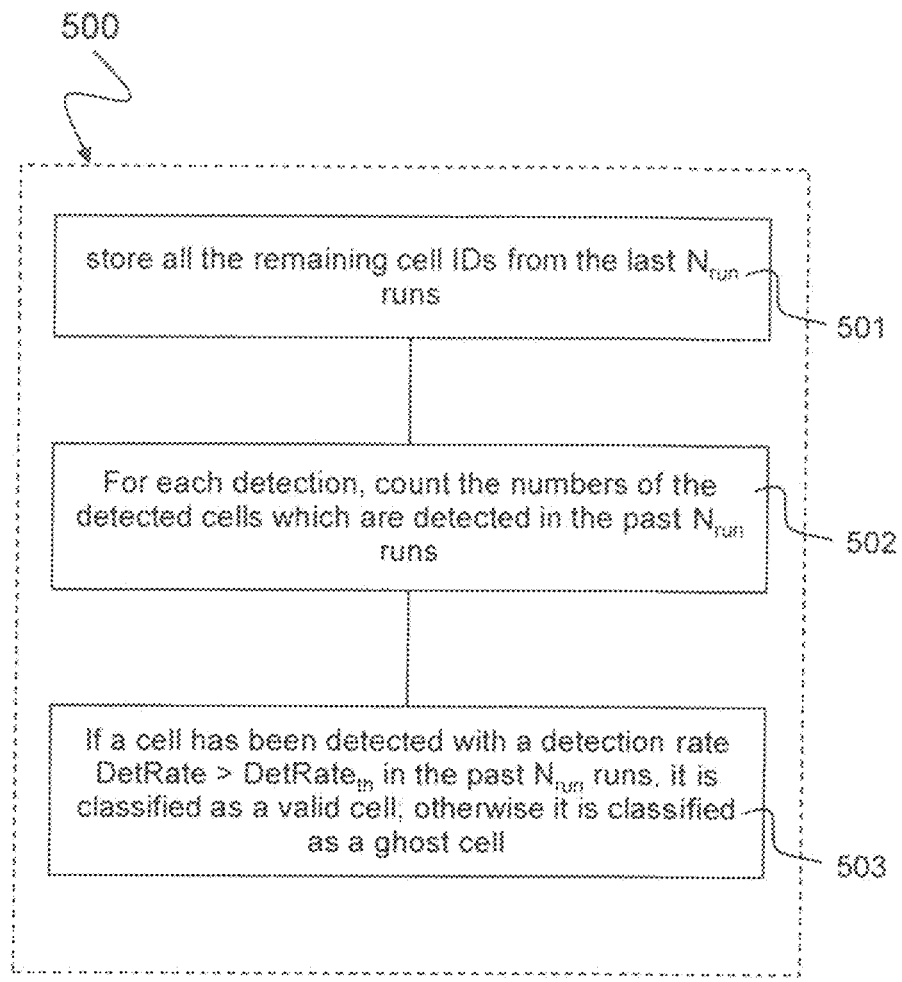
FIG. 5 is a schematic diagram illustrating a ghost cell detection algorithm 500 in accordance with the disclosure.

FIG. 5 is a schematic diagram illustrating a ghost cell detection algorithm 500 in accordance with the disclosure. The ghost cell detection algorithm 500 may include the following blocks:

1) Storing 501 all remaining cell IDs from the last $N_{run}$ runs (e.g. $N_{run}$=10).

2) for each detection, counting 502 the numbers of the detected cells which are detected in the past $N_{run}$ runs.

3) If a cell has been detected 503 with a detection rate DetRate>$DetRate_{th}$ in the past $N_{run}$ runs (e.g. DetRate$_{th}$=0.3), treating the cell as a valid cell. Otherwise, classify the cell as a ghost cell.

A strong new cell may statistically not be a ghost cell, therefore it may be declared as a valid cell once it appears. The sliding window size, i.e. the time for $N_{run}$ detection runs, can be chosen such that the UE can at least monitor the same eNBs within the time period of the sliding window even when the UE quickly moves. E.g., the window size can be a few seconds in the connected mode.

The ghost cell detection algorithm 500 may apply a statistical sliding window as described below and the algorithm 500 may be part of the ghost cell filtering block 204 described above with respect to FIG. 2.

Figure 6:
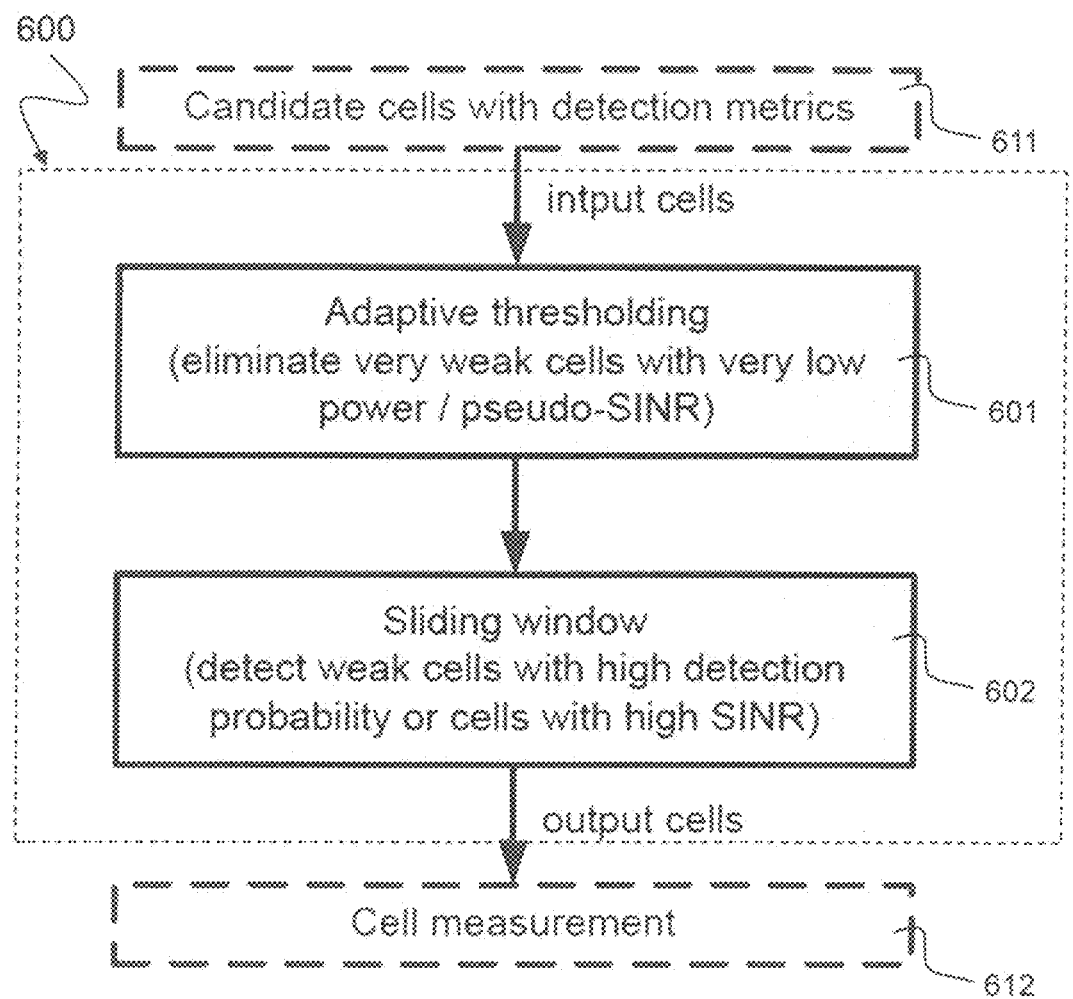
FIG. 6 is a block diagram illustrating a ghost cell filter 600 in accordance with the disclosure.

FIG. 6 is a block diagram illustrating a ghost cell filter 600 in accordance with the disclosure. The disclosed adaptive ghost cell filtering may be based on adaptive thresholding and the statistical sliding window, e.g. as described above with respect to FIG. 5. An exemplary algorithm is illustrated in FIGS. 5 and 6, and outlined below. Here, $N_{run}$, $DetRate_{th}$, SCH $SINR_{thL}$, SCH $SINR_{thH}$ are the predetermined parameters. The ghost cell filter 600 may include one or both of the following blocks A) and B):

A) Adaptive thresholding 601 to eliminate very weak cells with very low power or pseudo-SINR. E.g. cells having SCH $SINR_m$<SCH $SINR_{thL}$ as described above may be considered as ghost cells and eliminated.

B) Statistical sliding window 602 to detect weak cells with a relatively high detection probability. The Statistical sliding window block 602 may include the following sub-blocks:

i) Cell IDs of the latest $N_{run}$ runs after the adaptive thresholding may be recorded;

ii) If a new cell has, for example, an SCH $SINR_m$>SCH $SINR_{thH}$, or if a new cell has already been recorded with a detection rate DetRate>$DetRate_{th}$ times within last $N_{run}$ runs, then it may be declared as a valid cell; otherwise it may be considered as a ghost cell; and iii) Output the valid cells.

The ghost cell filtering 600 may receive candidate cells with detection metrics 611 as input, e.g. from the blocks PSS detection 201, SSS detection 202 and PSS-SSS combining & cell selection 203 as described above with respect to FIG. 2. The ghost cell filtering 600 may output cells to a cell measurement block 612, e.g. according to the block verification and final cell selection 205 described above with respect to FIG. 2.

The above procedure, i.e. the ghost cell filtering 600, may run for each carrier frequency separately. $N_{run}$, $DetRate_{th}$, SCH $SINR_{thL}$, SCH $SINR_{thH}$ may be dependent on the system requirements and setup. For 3GPP Rel. 10, the cell searcher needs to find all cells with SINR=−7.5 dB. An example parameter set can be chosen as follows: $N_{run}$=10, $DetRate_{th}$=0.3, SCH $SINR_{thL}$=−13 dB, SCH $SINR_{thH}$=−7 dB. For Rel. 8, SCH $SINR_{thH}$ can be set to be higher, and for Rel. 11, it can be set to be lower.

Alternative algorithms can also be derived, e.g. by first using the statistical sliding window 602, followed by the adaptive thresholding 601. According to simulations, they can also provide good performance. In addition, the disclosed method can also be combined with other rules, e.g. a simple rule $ë_m$<$ë_{th1}$ based on equation (24), SCH Ês/Iot, and so on. The disclosed ghost cell filtering algorithm is simple. The complexities in terms of computational cycles and memory are very small, typically per carrier frequency several hundred MAC (multiply-and-accumulate) operations and a few KBYTE (reusable) data memory. It can hence be implemented easily.

Figure 7:
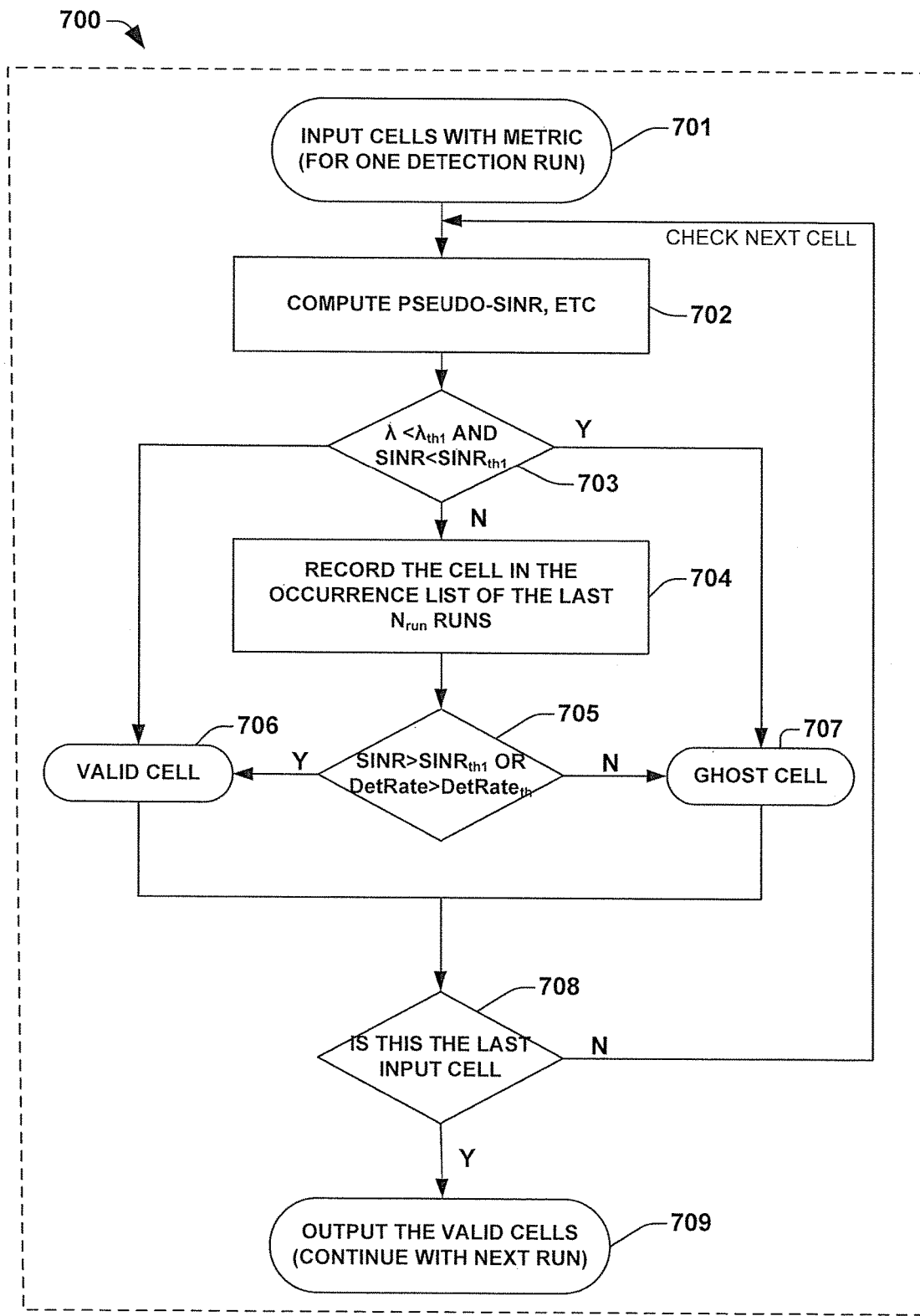
FIG. 7 is a block diagram illustrating a ghost cell filter 700 in accordance with the disclosure.

FIG. 7 is a block diagram illustrating a ghost cell filter 700 in accordance with the disclosure. The ghost cell filter 700 may include the following blocks: In a first block 701, input cells with a metric may be received for one detection run. Then, in a second block 702, pseudo-SINR etc. may be computed. In a third block 703, it may be checked if $ë$<$ë_{th1}$ and if SINR<$SINR_{th1}$. If that condition is true "Y" a ghost cell may be detected in a seventh block 707, otherwise on false "N", in a fourth block 704 the cell may be recorded in the occurrence list of the last $N_{run}$ runs. In a fifth block 705, it may be checked if SINR>$SINR_{th1}$ or if DetRate>$DetRate_{th}$. If that condition is true "Y" a valid cell may be detected in a sixth block 706, otherwise on true "Y", a ghost cell may be detected in the seventh block 707. After detection of a ghost cell 707 or of a valid cell 706, in an eighth block 708, it may be checked if this is the last input cell. If that condition is true "Y", the valid cells may be output and the ghost cell filter 700 may continue with the next run, otherwise on false "N", the next cell may be checked by continuing with the second block 702, i.e. computing pseudo-SINR etc.

Figure 8A:
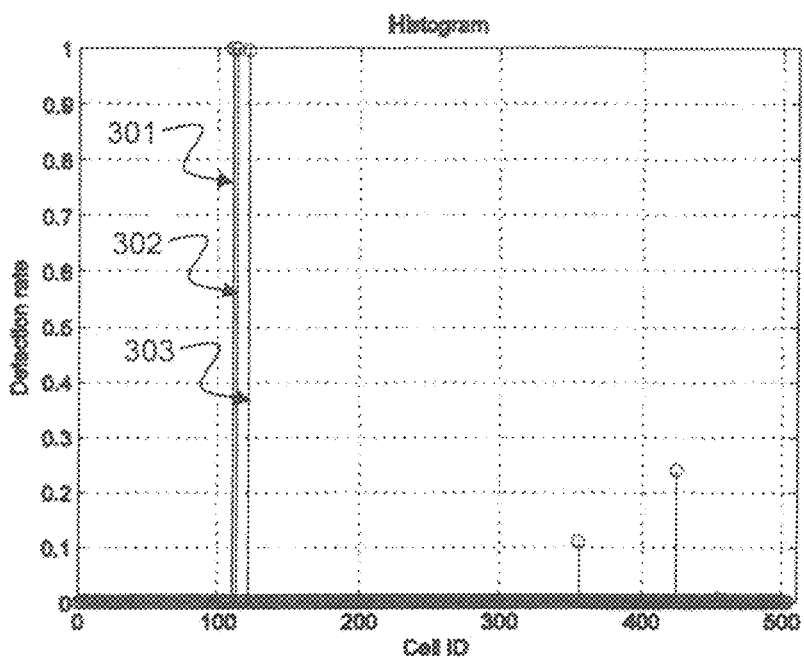
FIGS. 8A and 8B are histograms illustrating detection rates of valid cells and ghost cells after ghost cell filtering for an AWGN channel 800a (FIG. 8a) and for an ETU70 channel 800b (FIG. 8b) in accordance with the disclosure.
Figure 8B:
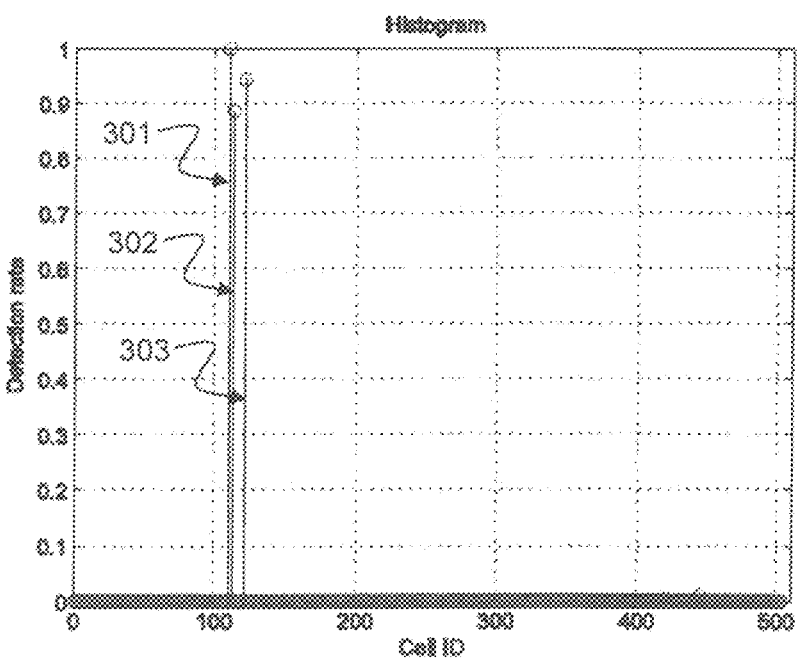

FIGS. 8a and 8b are histograms illustrating detection rates of valid cells and ghost cells after ghost cell filtering for the AWGN channel 800a (FIG. 8a) and for the ETU70 channel 800b (FIG. 8b) in accordance with the disclosure.

An example cell searcher illustrated in FIG. 2 is used to verify the disclosed ghost cell filter, where the PSS detection may be done in time domain through PSS based cross-correlation. The frequency domain SSS may be extracted after FFT. Then, SSS based cross-correlation, antenna combining, etc. A pre-defined number of cells having the highest detection metric may be sent to the ghost cell filter, e.g. a ghost cell filter 600, 700 as described above with respect to FIGS. 6 and 7. The ghost cell filter may finally output a number of the selected (valid) cells to the cell measurement unit. Two parameters may be used to measure the performance of the cell searcher with the ghost cell filter: Cell ID in-set (IS) rate which is the rate at which valid cells are within the set of the output cells. Cell ID false-alarm (FA) rate which is the rate of non-existing (ghost) cells within the set of the output cells.

Intensive simulations have been conducted to evaluate the disclosed ghost cell filter algorithm for different channel profiles (ETU, EVA, . . . ), mobile speeds, etc. defined for 3GPP LTE according to a mobile communication standard, such as 3GPP TR 36.814 v9.0.0, March 2010. The parameters for 3-cell scenarios were set according to a mobile communication standard, such as 3GPP R4-072074, "Performance of LTE cell identification in multi-cell environment", 3*GPP TS RA*4 *WG*4, Meeting #45, Jeju, Korea, November 2007 in which the normal and worst case multiple cell scenarios are defined (see Table 1 and 2). All three cells have the normal CP (cyclix prefix).

Some representative simulation results are shown in FIG. 8. As can be seen, the adaptive ghost cell filter disclosed can efficiently eliminate the ghost cells (=achieving low false-alarm rate) without sacrificing the cell detection capability (=achieving high cell in-set rate). Specifically, FIG. 4 and FIG. 8 may be compared for which the same system setup and test scenarios (cell configuration, SNR, channel, etc.) were applied. It can be seen that not only all valid cells 401, 402 and 403 (i.e. cells with the exemplary IDs 109, 112 and 120) can be reliably detected (with high detection rate), but most ghost cells (i.e. the cells with cell IDs other than 109, 112 and 120) can also be filtered out with the disclosed algorithm. The few (normally less than 2) remaining ghost cells after the ghost cell filtering (see e.g. FIG. 8) can easily be further removed in the cell measurement stage 205 as described above with respect to FIG. 2.

TABLE 1 cell scenarios used for simulations

|  | Cell 109 | Cell 120 | Cell 112 |
|---|---|---|---|
| SNR (dB) | 5.18 | 0.29 | {1.25, 0.25, −0.75} |
| Offset between eNB signals | 0 | 0 | 0 (synchronous) |
| Offset between eNB signals | 0 | ~ 0.5 ms | >2 ms (asynchronous) |

TABLE 2 simulation setup (CFO = carrier frequency offset)

| # of cells | 1, 3 |
|---|---|
| Channel model | AWGN, ETU70, . . . |
| # of Rx antennas | 2 |
| # of total halfframes used | 8 (4 for PSS detection and 4 for SSS detection) |
| CFO | 0, 1500 Hz |

Figure 9:
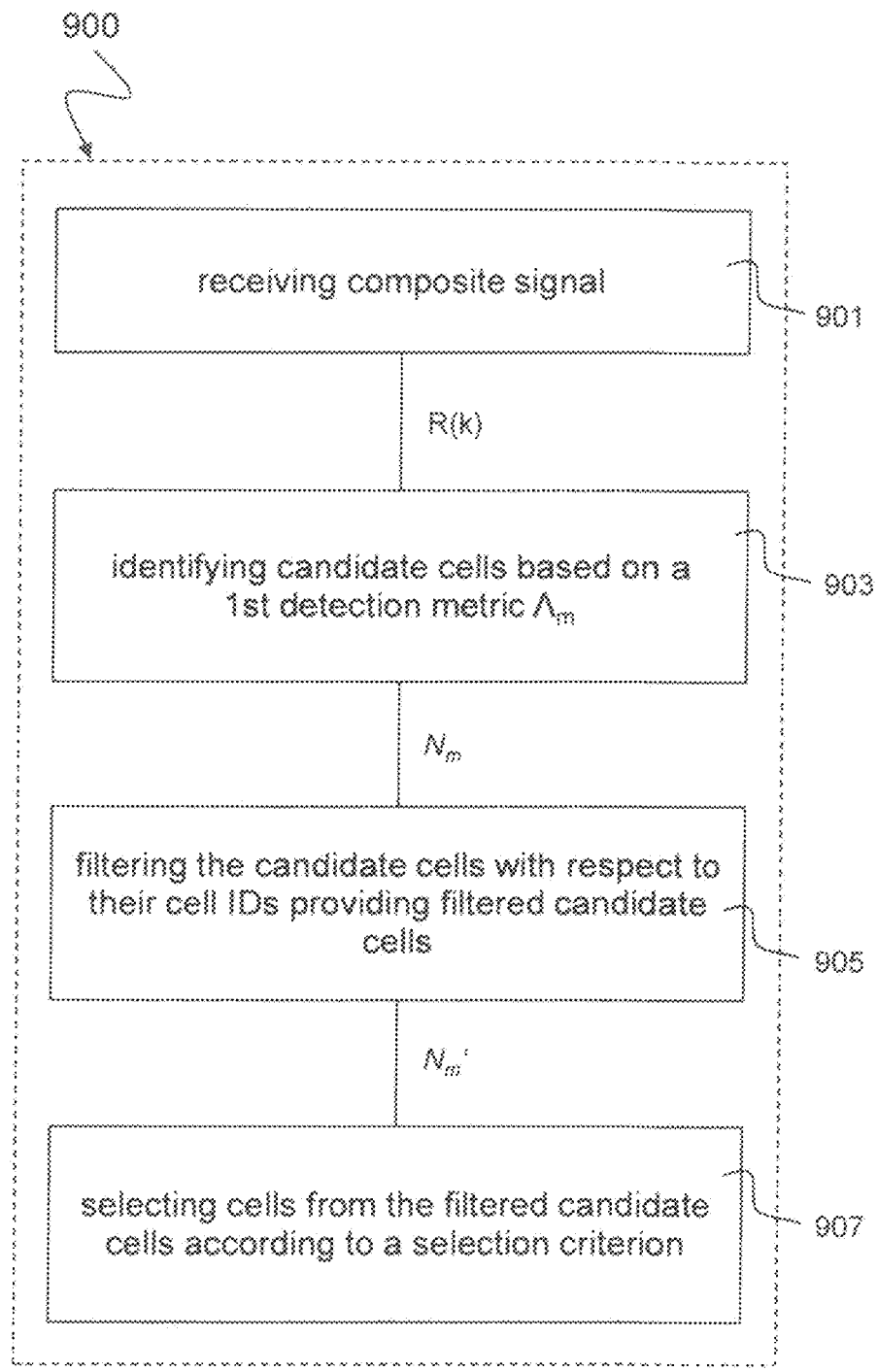
FIG. 9 is a schematic diagram illustrating a method 900 in accordance with the disclosure for ghost cell filtering.

FIG. 9 is a schematic diagram illustrating a method 900 in accordance with the disclosure for ghost cell filtering. The method 900 may include receiving 901 a composite signal R(k) comprising transmissions from a plurality of cells. The method 900 may further include identifying 903 candidate cells $N_m$ based on a first detection metric $\Lambda_m$ with respect to the composite signal R(k). The method 900 may further include filtering 905 the candidate cells $N_m$ with respect to their cell identifiers (exemplary denoted as m) to obtain filtered candidate cells $N_m'$. The method 900 may further include selecting 907 cells from the filtered candidate cells $N_m'$ according to a selection criterion.

The composite signal R(k) comprising transmissions from a plurality of cells may be a signal R(k) as defined above with respect to equation (4) or equation (14). The first detection metric $\Lambda_m$ may be a metric as defined above with respect to any of equations (13), (20), (21), (22), (23). The selection criterion may be based on CRS resource elements, e.g. based on RSRP, RSRQ, RSSI or a pseudo-SINR thereof as described above.

The identifying 903 may include the blocks PSS detection 201, SSS detection 202 and PSS-SSS combining & cell selection 203 as described above with respect to FIG. 2. The selecting 907 may include the block verification and final cell selection 205 as described above with respect to FIG. 2.

The filtering 205 may include the ghost cell detection algorithm 500 as described above with respect to FIG. 5. The filtering 205 may include the ghost cell filtering 600 as described above with respect to FIG. 6. That means, the filtering 205 may include the sliding window filtering 602 and/or the adaptive thresholding 601 as described above with respect to FIG. 6. The filtering 205 may include the ghost cell filter 700 as described above with respect to FIG. 7.

In an implementation, the filtering 905 the candidate cells $N_m$ includes forming 601 an adaptive threshold $SINR_{th}$ for a cell (m) of the candidate cells $N_m$ based on a second detection metric $SINR_m$. The second detection metric may be a metric as defined above with respect to any of equations (27), (28), (29), (30), (31).

In an implementation, the method 900 includes determining the second detection metric $SINR_m$ based on a pseudo signal-to-interference-and-noise ratio. The pseudo signal-to-interference-and-noise ratio may be a ratio as defined above with respect to any of equations (27), (28), (29), (30), (31).

In an implementation, the method 900 includes determining the second detection metric $SINR_m$ based on a third detection metric $\lambda_m$ and a noise estimate $\lambda_z$, wherein the third detection metric $\lambda_m$ has a one-to-one relation with the first detection metric $\Lambda_m$. The third detection metric may be a metric as defined above with respect to any of equations (24), (25), (26), (22), (23).

In an implementation, the method 900 includes determining the noise estimate $\Lambda_z$, $\lambda_z$ based on values of the first $\Lambda_m$ or the third $\lambda_m$ detection metric for cells (m) of the candidate cells $N_m$ with respect to a minimum criterion. The noise estimate may be determined according to equation (26).

In an implementation, the method 900 includes determining a signal energy $\Lambda_m - \Lambda_z$, $\lambda_m - \lambda_z$ of the pseudo signal-to-interference-and-noise ratio $SINR_m$ for a target cell (m) based on a difference between a value of the first $\Lambda_m$ or the third $\lambda_m$ detection metric for the target cell (m) and the noise estimate $\Lambda_z$, $\lambda_z$. The signal energy $\Lambda_m - \Lambda_z$ or $\lambda_m - \lambda_z$ may be determined according to any of equation (27), (28), (29), (30), (31).

In an implementation, the method 900 includes using the noise estimate $\lambda_z$, $\Lambda_z$ as a noise energy of the pseudo signal-to-interference-and-noise ratio $SINR_m$ for a target cell (m). The noise estimate $\Lambda_z$ or $\lambda_z$ may be used as noise term in any of equation (27), (28), (29), (30), (31).

In an implementation, the method 900 includes determining an interference energy $\Sigma(\Lambda_n-\Lambda_z)$, $\Sigma(\lambda_n-\lambda_z)$ of the pseudo signal-to-interference-and-noise ratio $SINR_m$ for a target cell (m) based on accumulated differences between values of the first $\Lambda_m$ or the third $\lambda_m$ detection metric for other cells (n) than the target cell (m) and the noise estimate $\lambda_z$, $\Lambda_z$. The interference energies $\Sigma(\Lambda_n-\Lambda_z)$ or $\Sigma(\lambda_n-\lambda_z)$ may be determined according to any of equation (27), (28), (29), (30), (31).

In an implementation, the method 900 includes accumulating the differences $\Lambda_n-\Lambda_z$, $\lambda_n-\lambda_z$ over a subset $n \in N_m$ of the candidate cells $N_m$. The subset may be chosen according to any of the equations (29), (30), (31).

In an implementation, the method 900 includes determining the subset $n \in N_m$ based on an energy of the values of the first $\Lambda_m$ or the third $\lambda_m$ detection metric for the candidate cells $N_m$. The subset may be chosen according to any of the equations (29), (30), (31), e.g. including a number of strongest cells, for example one, two or three neighbor cells having the highest third detection metrics $\lambda_m$.

In an implementation, the filtering 905 the candidate cells $N_m$ includes weighting 602 the candidate cells $N_m$ by a sliding window over a number of iterations $N_{run}$ of the candidate cells identification 903. The weighting 602 may include the sliding window filtering as described above with respect to one of FIGS. 5, 6 and 7.

In an implementation, the weighting 602 may include recording 704 the candidate cells in a sliding window memory. The recording may be as described above with respect to FIG. 7.

In an implementation, the filtering 905 the candidate cells $N_m$ may be based on a threshold $DetRate_{th}$ with respect to a detection rate $DetRate_{th}$ of the candidate cells $N_m$ within the sliding window as described above with respect to FIGS. 5 to 7.

In an implementation, the filtering 905 the candidate cells $N_m$ may be based on a threshold $SINR_{thL}$, or/and $SINR_{thH}$ with respect to a pseudo signal-to-interference-and-noise ratio SINR of the candidate cells $N_m$ within the sliding window as described above with respect to FIGS. 5 to 7.

Figure 10:
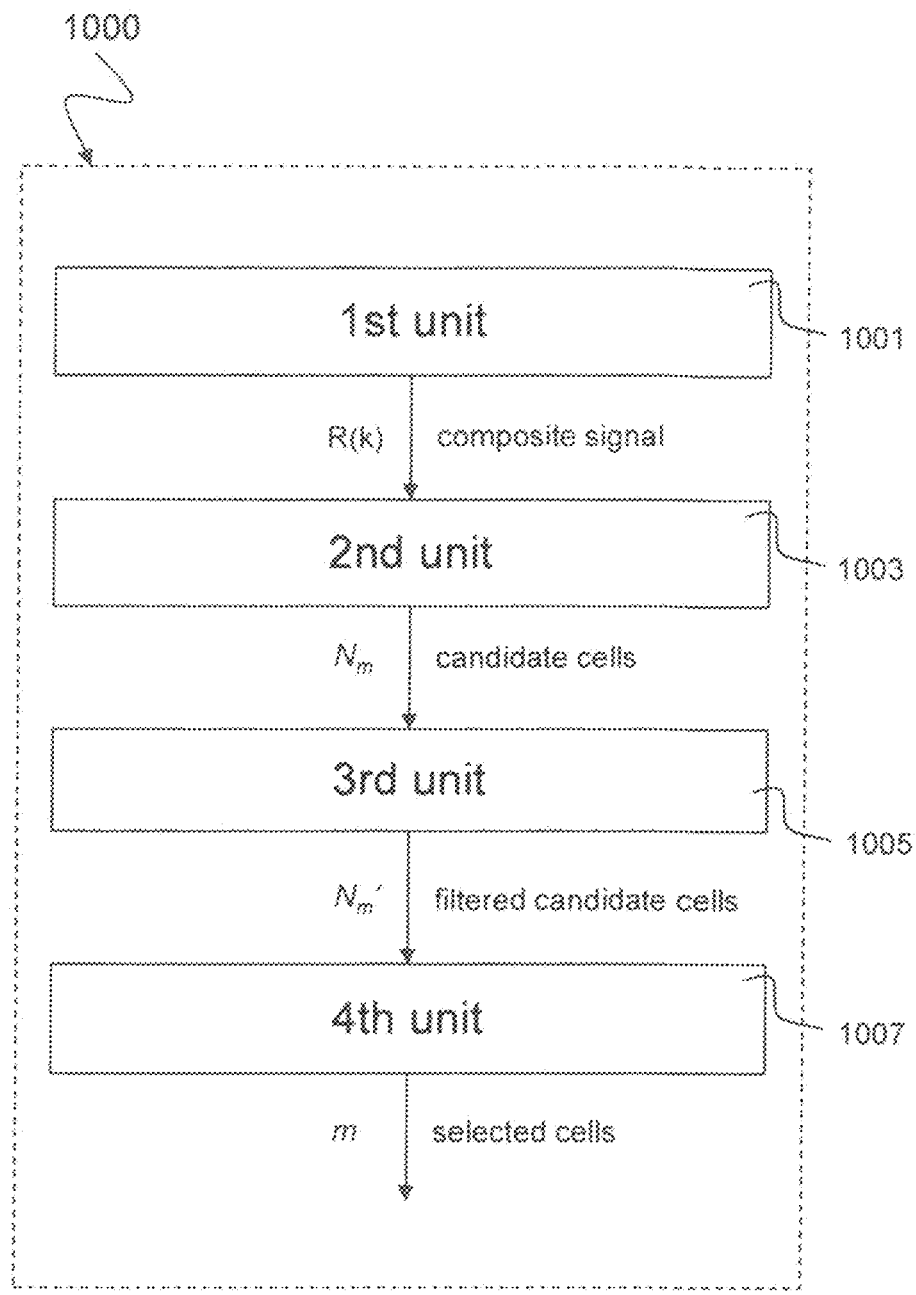
FIG. 10 is a schematic diagram illustrating a device 1000 in accordance with the disclosure for ghost cell filtering.

FIG. 10 is a schematic diagram illustrating a device 1000 in accordance with the disclosure for ghost cell filtering.

The device 1000 may include a first unit 1001 configured to receive a composite signal R(k) comprising transmissions from a plurality of cells. The device 1000 may further include a second unit 1003 configured to identify candidate cells $N_m$ based on a first detection metric $\Lambda_m$ with respect to the composite signal R(k). The device 1000 may further include a third unit 1005 configured to filter the candidate cells $N_m$ with respect to their cell identifiers (m) to obtain filtered candidate cells $N_m'$. The device 1000 may further include a fourth unit 1007 configured to select cells (m) from the filtered candidate cells $N_m'$ according to a selection criterion.

The device 1000 may implement the method 900 as described above with respect to FIG. 9.

The composite signal R(k) comprising transmissions from a plurality of cells may be a signal R(k) as defined above with respect to equation (4) or equation (14). The first detection metric $\Lambda_m$ may be a metric as defined above with respect to any of equations (13), (20), (21), (22), (23). The selection criterion may be based on CRS resource elements, e.g. based on RSRP, RSRQ, RSSI or a pseudo-SINR thereof as described above.

The second unit 1003 may include the blocks PSS detection 201, SSS detection 202 and PSS-SSS combining & cell selection 203 as described above with respect to FIG. 2. The fourth unit 1007 may include the block verification and final cell selection 205 as described above with respect to FIG. 2.

The third unit 1005 may include the ghost cell detection algorithm 500 as described above with respect to FIG. 5. The third unit 1005 may include the ghost cell filtering 600 as described above with respect to FIG. 6. That means, the third unit 1005 may include the sliding window filtering 602 and/or the adaptive thresholding 601 as described above with respect to FIG. 6. The third unit 1005 may include the ghost cell filter 700 as described above with respect to FIG. 7.

In an implementation, the device 1000 may include a fifth unit configured to determine the first detection metric $\Lambda_m$ with respect to a cell identifier (m) of the cells of the plurality of cells as described above.

In an implementation, the device 1000 may include a sixth unit configured to determine the first detection metric $\Lambda_m$ based on non-coherent detection as described above.

In an implementation, the device 1000 may include a seventh unit configured to determine the first detection metric $\Lambda_m$ based on a correlation between a known pilot signal $S_m(k)$ and a received pilot signal comprised in the composite signal R(k) as described above.

In an implementation, the known pilot signal $S_m(k)$ may include at least one of a primary synchronization signal (PSS), a secondary synchronization signal (SSS) and a cell-specific reference signal (CRS) as described above.

In an implementation, the seventh unit may be configured to determine the first detection metric $\Lambda_m$ based on a combination of at least two of the following metrics: a correlation with respect to a PSS signal, a correlation with respect to an SSS signal, and a correlation with respect to a CRS signal as described above.

In an implementation, the device 1000 may include an eighth unit configured to adjust the first detection metric $\Lambda_m$ with respect to contributions from correlated pilot signals $S_n'(k)$ of other cells (n) as described above.

In an implementation, the selection criterion is based on cell-specific reference signals as described above.

In an implementation, the selection criterion may be based on one of a reference signal received power, a reference signal received quality and a reference signal strength indicator of the filtered candidate cells ($N_m'$) or on a pseudo signal-to-interference-and-noise ratio thereof as described above.

The adaptive ghost cell filter within the cell identification disclosed herein may be based on adaptive thresholding and statistical sliding window, where the former may utilize the so-called pseudo-SINR (introduced in this disclosure) to eliminate the ghost cells, and the latter may be employed to detect the relatively weak but real cells. Excellent performance has been obtained by using the disclosed ghost filter. The disclosed ghost cell filter within cell identification is important, especially for low bandwidth LTE/LTE-A systems, to ensure low-cost and high-performance. The default bandwidth for a cell searcher may be the lowest bandwidth 1.4 MHz anyway. The disclosed method can not only be employed in the LTE searcher based on the non-coherent detection, but also in other cell detection algorithms.

EXAMPLES

The following examples pertain to further embodiments. Example 1 is a method, comprising: receiving a composite signal comprising transmissions from a plurality of cells; identifying a plurality of candidate cells based on a first detection metric with respect to the composite signal; filtering the plurality of candidate cells with respect to cell identifiers of the plurality of candidate cells to obtain a plurality of filtered candidate cells; and selecting from the plurality of filtered candidate cells a plurality of selected cells according to a selection criterion.

In Example 2, the subject matter of Example 1 can optionally include that the filtering the candidate cells comprises: forming an adaptive threshold for a cell of the candidate cells based on a second detection metric.

In Example 3, the subject matter of Example 2 can optionally include determining the second detection metric based on a pseudo signal-to-interference-and-noise ratio.

In Example 4, the subject matter of Example 3 can optionally include determining the second detection metric based on a third detection metric and a noise estimate, wherein the third detection metric has a one-to-one relation with the first detection metric.

In Example 5, the subject matter of Example 4 can optionally include determining the noise estimate based on values of the first or the third detection metric for cells of the candidate cells with respect to a minimum criterion.

In Example 6, the subject matter of any one of Examples 3-4 can optionally include determining a signal energy of the pseudo signal-to-interference-and-noise ratio for a target cell based on a difference between a value of the first or the third detection metric for the target cell and the noise estimate.

In Example 7, the subject matter of any one of Examples 4-6 can optionally include using the noise estimate as a noise energy of the pseudo signal-to-interference-and-noise ratio for a target cell.

In Example 8, the subject matter of any one of Examples 4-7 can optionally include determining an interference energy of the pseudo signal-to-interference-and-noise ratio for a target cell based on accumulated differences between values of the first or the third detection metric for other cells than the target cell and the noise estimate.

In Example 9, the subject matter of Example 8 can optionally include accumulating the differences over a subset of the candidate cells.

In Example 10, the subject matter of Example 9 can optionally include determining the subset based on an energy of the values of the first or the third detection metric for the candidate cells.

In Example 11, the subject matter of any one of Examples 1-10 can optionally include that the filtering the candidate cells comprises: weighting the candidate cells by a sliding window over a number of iterations of the candidate cells identification.

In Example 12, the subject matter of Example 11 can optionally include that the weighting comprises recording the candidate cells in a sliding window memory.

In Example 13, the subject matter of any one of Examples 11-12 can optionally include that the filtering the candidate cells is based on a threshold with respect to a detection rate of the candidate cells within the sliding window.

In Example 14, the subject matter of any one of Examples 11-13 can optionally include that the filtering the candidate cells is based on a threshold with respect to a pseudo signal-to-interference-and-noise ratio of the candidate cells within the sliding window.

In Example 15 is a device, comprising: a first unit configured to receive a composite signal comprising transmissions from a plurality of cells; a second unit configured to identify plurality of candidate cells based on a first detection metric with respect to the composite signal; a third unit configured to filter the plurality of candidate cells with respect to cell identifiers of the plurality of candidate cells to obtain a plurality of filtered candidate cells; and a fourth unit configured to select from the filtered candidate cells a plurality of selected cells according to a selection criterion.

In Example 16, the subject matter of Example 15 can optionally include a fifth unit configured to determine the first detection metric with respect to a cell identifier of the plurality of cells.

In Example 17, the subject matter of any one of Examples 15-16 can optionally include a sixth unit configured to determine the first detection metric based on non-coherent detection.

In Example 18, the subject matter of any one of Examples 15-17 can optionally include a seventh unit configured to determine the first detection metric based on a correlation between a known pilot signal and a received pilot signal comprised in the composite signal.

In Example 19, the subject matter of Example 18 can optionally include that the known pilot signal comprises at least one of a primary synchronization signal, a secondary synchronization signal and a cell-specific reference signal.

In Example 20, the subject matter of any one of Examples 18-19 can optionally include that the seventh unit is configured to determine the first detection metric based on a combination of at least two of the following metrics: a correlation with respect to a PSS signal, a correlation with respect to an SSS signal, and a correlation with respect to a CRS signal.

In Example 21, the subject matter of any one of Examples 15-20 can optionally include an eighth unit configured to adjust the first detection metric with respect to contributions from correlated pilot signals of other cells.

In Example 22, the subject matter of any one of Examples 15-21 can optionally include that the selection criterion is based on cell-specific reference signals.

In Example 23, the subject matter of any one of Examples 15-22 can optionally include that the selection criterion is based on one of a reference signal received power, a reference signal received quality and a reference signal strength indicator of the filtered candidate cells or on a pseudo signal-to-interference-and-noise ratio thereof.

Example 24 is a method for determining a pseudo signal-to-interference-and-noise ratio metric for a particular cell of a set of cells, the method comprising: determining a noise energy based on values of a detection metric with respect to cells of the set of cells according to a minimum criterion; determining a signal energy based on a difference between a value of the detection metric with respect to the particular cell and the noise energy; and determining an interference energy based on differences between values of the detection metric with respect to cells unequal to the particular cell and the noise energy.

In Example 25, the subject matter of Example 24 can optionally include accumulating the differences between values of the detection metric with respect to cells unequal to the particular cell and the noise energy over a subset of the set of cells.

In Example 26, the subject matter of Example 25 can optionally include that the subset comprises all cells of the set of cells beside the particular cell.

In Example 27, the subject matter of any one of Examples 25-26 can optionally include determining the subset based on an energy of the values of the detection metric.

In Example 28, the subject matter of any one of Examples 25-27 can optionally include that the subset comprises values of the detection metric for which energies are maximum.

In Example 29, the subject matter of Example 28 can optionally include ordering values of the detection metric with respect to their energies to provide the values for the subset.

In Example 30, the subject matter of any one of Examples 24-29 can optionally include that the set of cells comprises cells of a cellular radio system, each cell comprising a base station.

Example 31 is a cellular radio system, comprising: a plurality of cells, each cell comprising a base station; and a user equipment, comprising: a first unit configured to receive a composite signal comprising transmissions from the plurality of cells; a second unit configured to identify candidate cells based on a first detection metric with respect to the composite signal; a third unit configured to filter the candidate cells with respect to their cell identifiers to obtain filtered candidate cells; and a fourth unit configured to select cells from the filtered candidate cells according to a selection criterion.

In Example 32, the subject matter of Example 31 can optionally include that the user equipment comprises a fifth unit configured to determine the first detection metric with respect to a cell identifier of the cells of the plurality of cells.

Example 33 is a base station, comprising: a first unit configured to receive a composite signal comprising transmissions from a plurality of user equipments; a second unit configured to identify candidate user equipments based on a first detection metric with respect to the composite signal; a third unit configured to filter the candidate user equipments with respect to their mobile identifiers to obtain filtered candidate user equipments; and a fourth unit configured to select user equipments from the filtered candidate user equipments according to a selection criterion.

In Example 34, the subject matter of Example 33 can optionally include a fifth unit configured to determine the first detection metric with respect to a mobile identifier of the user equipments of the plurality of user equipments.

Example 35 is a method for filtering candidate cells, comprising: means for receiving a composite signal comprising transmissions from a plurality of cells; means for identifying candidate cells based on a first detection metric with respect to the composite signal; means for filtering the candidate cells with respect to their cell identifiers to obtain filtered candidate cells; and means for selecting cells from the filtered candidate cells according to a selection criterion.

In Example 36, the subject matter of Example 35 can optionally include means for determining the first detection metric with respect to a cell identifier of the cells of the plurality of cells.

In Example 37, the subject matter of any one of Examples 35-36 can optionally include means for determining the first detection metric based on non-coherent detection.

In Example 38, the subject matter of any one of Examples 35-37 can optionally include means for determining the first detection metric based on a correlation between a known pilot signal and a received pilot signal comprised in the composite signal.

In Example 39, the subject matter of Example 38 can optionally include that the known pilot signal comprises at least one of a primary synchronization signal, a secondary synchronization signal and a cell-specific reference signal.

In Example 40, the subject matter of Example 39 can optionally include that the means for determining the first detection metric is configured to determine the first detection metric based on a combination of at least two of the following metrics: a correlation with respect to a PSS signal, a correlation with respect to an SSS signal, and a correlation with respect to a CRS signal.

In Example 41, the subject matter of any one of Examples 35-40 can optionally include means for adjusting the first detection metric with respect to contributions from correlated pilot signals of other cells.

In Example 42, the subject matter of any one of Examples 35-41 can optionally include that the selection criterion is based on cell-specific reference signals.

In Example 43, the subject matter of any one of Examples 35-42 can optionally include that the selection criterion is based on one of a reference signal received power, a reference signal received quality and a reference signal strength indicator of the filtered candidate cells or on a pseudo signal-to-interference-and-noise ratio thereof.

In Example 44, the subject matter of any one of Examples 15-23 can optionally include that the third unit is configured to form an adaptive threshold for a cell of the candidate cells based on a second detection metric.

In Example 45, the subject matter of Example 44 can optionally include that the third unit is configured to determine the second detection metric based on a pseudo signal-to-interference-and-noise ratio.

In Example 46, the subject matter of any one of Examples 44-45 can optionally include that the third unit is configured to determine the second detection metric based on a third detection metric and a noise estimate, wherein the third detection metric has a one-to-one relation with the first detection metric.

In Example 47, the subject matter of Example 46 can optionally include that the third unit is configured to determine the noise estimate based on values of the first or the third detection metric for cells of the candidate cells with respect to a minimum criterion.

In Example 48, the subject matter of any one of Examples 46-47 can optionally include that the third unit is configured to determine a signal energy of the pseudo signal-to-interference-and-noise ratio for a target cell based on a difference between a value of the first or the third detection metric for the target cell and the noise estimate.

In Example 49, the subject matter of any one of Examples 46-48 can optionally include that the third unit is configured to use the noise estimate as a noise energy of the pseudo signal-to-interference-and-noise ratio for a target cell.

In Example 50, the subject matter of any one of Examples 46-49 can optionally include that the third unit is configured to determine an interference energy of the pseudo signal-to-interference-and-noise ratio for a target cell based on accumulated differences between values of the first or the third detection metric for other cells than the target cell and the noise estimate.

In Example 51, the subject matter of Example 50 can optionally include that the third unit is configured to accumulate the differences over a subset of the candidate cells.

In Example 52, the subject matter of Example 51 can optionally include that the third unit is configured to determine the subset based on an energy of the values of the first or the third detection metric for the candidate cells.

In Example 53, the subject matter of any one of Examples 15-23 can optionally include that the third unit is configured to weight the candidate cells by a sliding window over a number of iterations of the candidate cells identification.

In Example 54, the subject matter of any one of Examples 15-23 and 53 can optionally include that the third unit is configured to record the candidate cells in a sliding window memory.

In Example 55, the subject matter of any one of Examples 53-54 can optionally include that the third unit is configured to filter the candidate cells based on a threshold with respect to a detection rate of the candidate cells within the sliding window.

In Example 56, the subject matter of any one of Examples 53-55 can optionally include that the third unit is configured to filter the candidate cells based on a threshold with respect to a pseudo signal-to-interference-and-noise ratio of the candidate cells within the sliding window.

Example 57 is a computer readable medium on which computer instructions are stored which when executed by a computer, cause the computer to perform the method of one of Examples 1 to 14, 24 to 30 and 35 to 43.

While a particular feature or aspect of the disclosure may have been disclosed with respect to only one of several implementations, such feature or aspect may be combined with one or more other features or aspects of the other implementations as may be desired and advantageous for any given or particular application. Implementations are not limited to the features defined by the claims. In particular, each feature of any claim may be liberally combined with any other feature of each claim. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

What is claimed is:

1. A method, comprising:
   receiving a composite signal comprising transmissions from a plurality of cells;
   identifying a plurality of candidate cells based on a first detection metric with respect to the composite signal over a plurality of frames thereof;
   filtering the plurality of candidate cells with respect to cell identifiers of the plurality of candidate cells to obtain a plurality of filtered candidate cells, wherein filtering the plurality of candidate cells comprises:
     removing one or more of the plurality of candidate cells as ghost cells if a number of times the one or more of the pluralilty of candidate cells is detected over the plurality of frames is less than a predetermined detection frequency threshold; and
   selecting from the plurality of filtered candidate cells a plurality of selected cells according to a selection criterion.

2. The method of claim 1, wherein the filtering the candidate cells further comprises:
   forming an adaptive threshold for a cell of the plurality of candidate cells based on a second detection metric.

3. The method of claim 2, comprising:
   determining the second detection metric based on a pseudo signal-to-interference-and-noise ratio.

4. The method of claim 3, comprising:
   determining the second detection metric based on a third detection metric and a noise estimate, wherein the third detection metric has a one-to-one relation with the first detection metric.

5. The method of claim 3, comprising:
   determining a signal energy of the pseudo signal-to-interference-and-noise ratio for a target cell based on a difference between a value of the first detection metric or the third detection metric for the target cell and the noise estimate.

6. The method of claim 4, comprising:
   determining the noise estimate based on values of the first detection metric or the third detection metric for the cell of the plurality of candidate cells with respect to a minimum criterion.

7. The method of claim 4, comprising:
   using the noise estimate as a noise energy of the pseudo signal-to-interference-and-noise ratio for a target cell.

8. The method of claim 4, comprising:
   determining an interference energy of the pseudo signal-to-interference-and-noise ratio for a target cell based on accumulated differences between values of the first detection metric or the third detection metric for other plurality of cells than the target cell and the noise estimate.

9. The method of claim 8, comprising:
   accumulating the differences over a subset of the plurality of candidate cells.

10. The method of claim 9, comprising:
    determining the subset based on an energy of the values of the first detection metric or the third detection metric for the plurality of candidate cells.

11. A device, comprising:
    a first circuit configured to receive a composite signal comprising transmissions from a plurality of cells;
    a second circuit configured to identify a plurality of ndidate cells based on a first detection metric with respect to the composite signal over a plurality of frames thereof;
    a third circuit configured to filter the plurality of candidate cells with respect to cell identifiers of the plurality of candidate cells to obtain a plurality of filtered candidate cells, wherein filtering the plurality of candidate cells comprises:
      removing one or more of the plurality of candidate cells as ghost cells if a number of times the one or more of the pluralilty of candidate cells is detected over the plurality of frames is less than a predetermined detection frequency threshold; and
    a fourth circuit configured to select from the filtered candidate cells a plurality of selected cells according to a selection criterion.

12. The device of claim 11, comprising:
    a fifth circuit configured to determine the first detection metric with respect to a cell identifier of the plurality of cells.

13. The device of claim 11, comprising:
    a sixth circuit configured to determine the first detection metric based on non-coherent detection.

14. The device of claim 11, comprising:
a seventh circuit configured to determine the first detection metric based on a correlation between a known pilot signal and a received pilot signal comprised in the composite signal.

15. A cellular radio system, comprising:
a plurality of cells, each cell comprising a base station; and
a user equipment, comprising:
- a first circuit configured to receive a composite signal comprising transmissions from the plurality of cells;
- a second circuit configured to identify candidate cells based on a first detection metric with respect to the composite signal over a plurality of frames thereof;
- a third circuit configured to filter the candidate cells with respect to their cell identifiers to obtain filtered candidate cells, wherein filtering the plurality of candidate cells comprises:
  - removing one or more of the plurality of candidate cells as ghost cells if a number of times the one or more of the pluralilty of candidate cells is detected over the plurality of frames is less than a predetermined detection frequency threshold; and
- a fourth circuit configured to select cells from the filtered candidate cells according to a selection criterion.

16. The system of claim 15, wherein the user equipment further comprises:
a fifth circuit configured to determine the first detection metric with respect to a cell identifier of the cells of the plurality of cells.

\* \* \* \* \*